United States Patent

Takahashi et al.

[11] Patent Number: 6,057,967
[45] Date of Patent: May 2, 2000

[54] APPARATUS FOR EXTRACTING PATTERN FEATURES

[75] Inventors: Tomoichi Takahashi, Tokyo; Kazuyoshi Tateishi, Yokohama; Akinori Watabe, Hannou, all of Japan

[73] Assignee: Nippon Telegraph and Telephone Corporation, Tokyo, Japan

[21] Appl. No.: 09/186,367

[22] Filed: Nov. 5, 1998

Related U.S. Application Data

[62] Division of application No. 08/697,603, Aug. 27, 1996, Pat. No. 5,870,490, which is a continuation of application No. 08/228,423, Apr. 15, 1994, abandoned.

[30] Foreign Application Priority Data

Apr. 16, 1993 [JP] Japan .................................... 5-089634

[51] Int. Cl.$^7$ .................................................. G02B 27/30
[52] U.S. Cl. .......................................... 359/641; 359/196
[58] Field of Search ............................. 369/44; 359/662, 359/204, 641

[56] References Cited

U.S. PATENT DOCUMENTS

| | | | |
|---|---|---|---|
| 4,129,355 | 12/1978 | Noguchi | 359/210 |
| 4,419,614 | 12/1983 | Kimura | 318/653 |
| 4,636,043 | 1/1987 | Bellar | 359/223 |
| 4,645,348 | 2/1987 | Dewar et al. | 356/376 |
| 4,645,917 | 2/1987 | Penney et al. | 356/376 |
| 4,700,336 | 10/1987 | Yoshida et al. | 369/110 |
| 4,796,997 | 1/1989 | Svetkoff et al. | 356/376 |
| 5,035,476 | 7/1991 | Ellis et al. | 359/202 |
| 5,055,663 | 10/1991 | Morimoto et al. | 250/201.4 |
| 5,185,676 | 2/1993 | Nishiberi | 359/202 |
| 5,218,427 | 6/1993 | Koch | 356/376 |
| 5,231,470 | 7/1993 | Koch | 356/576 |
| 5,373,362 | 12/1994 | Kano et al. | 356/376 |
| 5,841,566 | 11/1998 | Minakuchi et al. | 359/204 |

OTHER PUBLICATIONS

Nurre et al., "Encoded Moire Inspection Based on a Computer Solid Model," IEEE Trans. on Pattern Analysis and Machine Intelligence, vol. 14, No. 12, pp. 1214–1218, Dec. 1992.

*Primary Examiner*—Scott J. Sugarman
*Assistant Examiner*—Younggil T. Lee
*Attorney, Agent, or Firm*—Finnegan, Henderson, Farabow, Garrett & Dunner, L.L.P.

[57] ABSTRACT

An apparatus is presented for extracting configurational features of an object formed by a number of surfaces with a two-dimensional laser pattern. Changes in the shape can be tracked, and speedy three-dimensional measurements are made possible in a small memory area without requiring parameter adjustment. The device comprises a two-dimensional laser pattern generating device 61 which projects laser light in a desired two-dimensional pattern configuration, a three-dimensional position calculating device 62 which synchronizes the timing of the laser light illumination with the timing of the detection of two-dimensional points. Three-dimensional coordinates of a surface point are rapidly calculated, then the surface parameters are determined by the three-dimensional positions of a number of points (three points or more). A pattern information generating device 63 varies the pattern to be projected in accordance with the surface parameters so obtained, and a pattern recognition device 64 controls the movements of a robot in accordance with variations in configuration based on the edge lines, vertexes and other features determined by a number of plane surfaces.

5 Claims, 20 Drawing Sheets

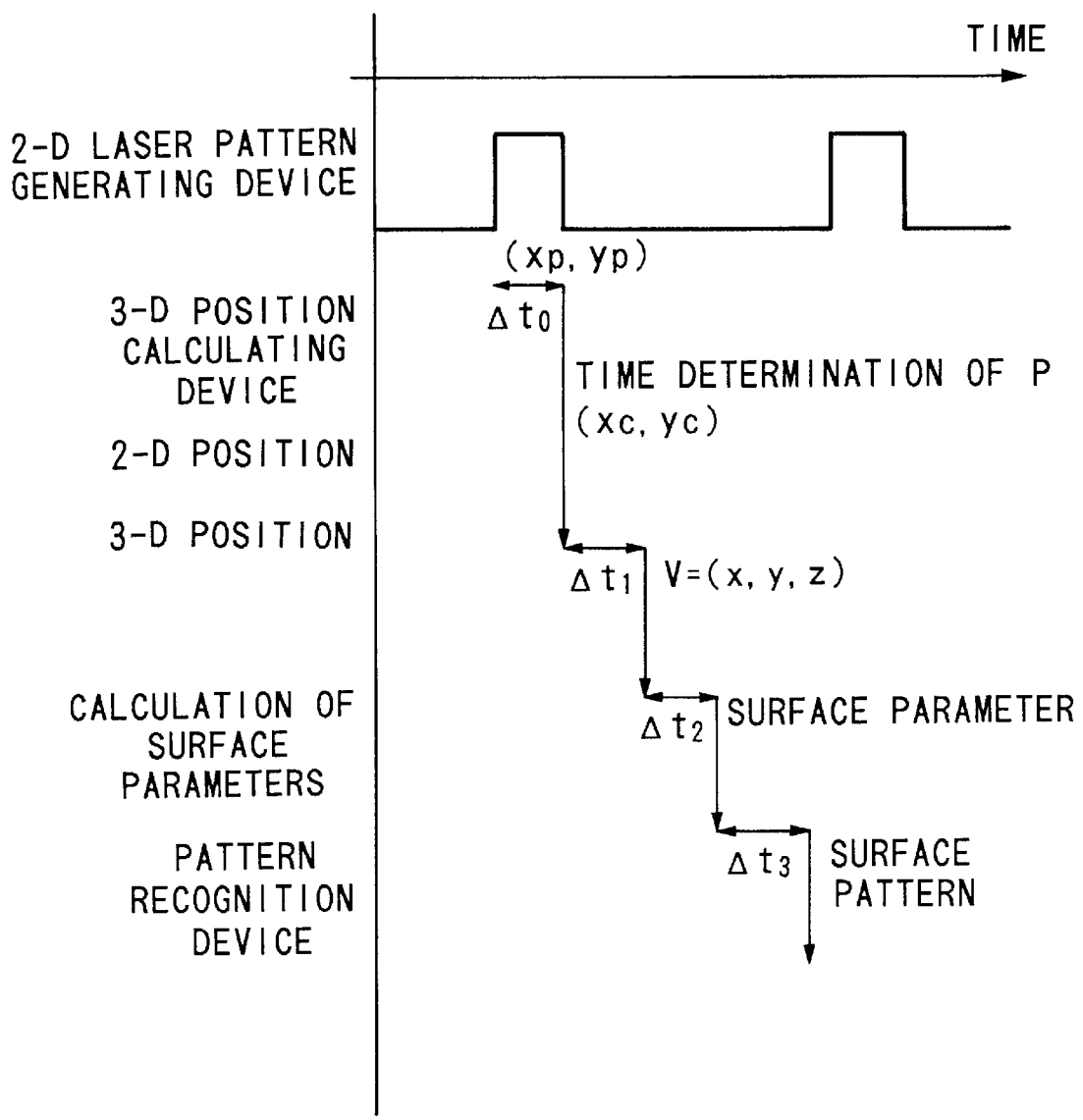

M: NUMBER OF CHARACTERIZING POINTS IN 1 CYCLE
N: NUMBER OF MEASURING POINTS IN 1 CYCLE

LIST OF CASES AND CHARACTERISING POINTS

FIG. 22
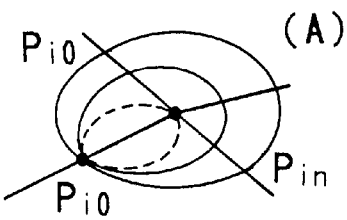
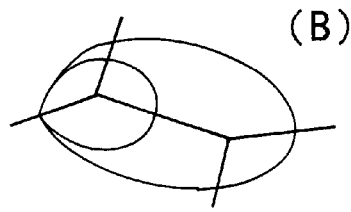
(1) ENLARGE THE PATTERN IF IT IS SMALLER THAN THE PREDETERMINED MINIMUM SIZE
(2) ABOVE MENTIONED CASE (A) INCLUDES THE CASE WHEREIN THE PATTERN SIZE IS EQUAL TO THE MINIMUM SIZE, $P_N$ IS OBTAINED FOR SUMMITS (i-1, n) ACCORDING TO A PROCEDURE SIMILAR TO CASE 3

FIG. 27
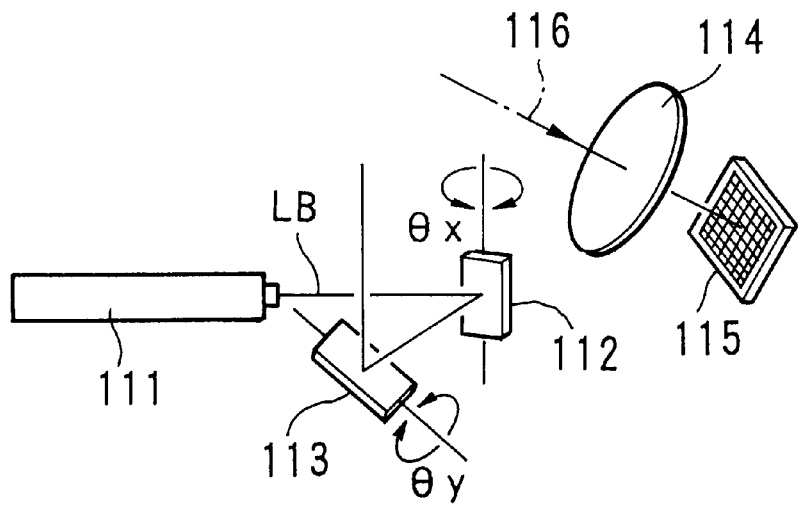
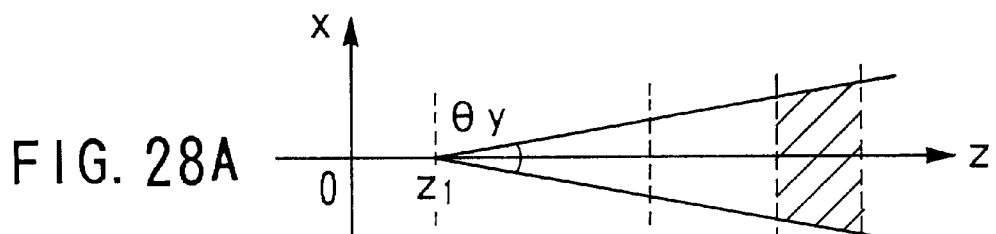
FIG. 28A
FIG. 28B
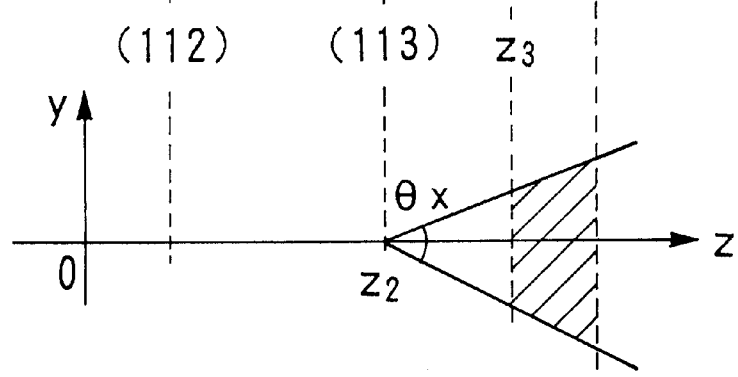
FIG. 28C
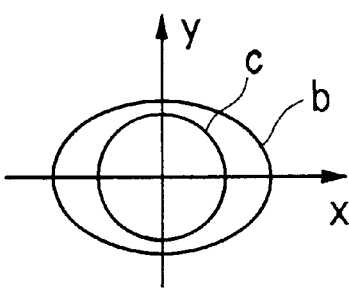

APPARATUS FOR EXTRACTING PATTERN FEATURES

This is a division of application Ser. No. 08/697,603, filed Aug. 27, 1996, now U.S. Pat. No. 5,870,490 which is a continuation of Ser. No. 08/228,423, filed Apr. 15, 1994, now abandoned, all of which are incorporated herein by reference.

BACKGROUND OF THE INVENTION

1. Field of the Invention

The present invention relates in general to an apparatus for recognizing and extracting pattern features which uses a two-dimensional laser pattern for three-dimensional measurement, and relates in particular to an apparatus for inspecting external appearance, extracting configurational features for synthesis of robot trajectory generation, and to an associated two-dimensional laser pattern generating device.

2. Technical Background

According to "Three-dimensional Image Measurement" by Iguchi and Sato, Shokodo Publishing Co., or to an English text, "Three Dimensional Machine Vision" by Takeo Kanade, the following measurement methods have been known:

(1) methods wherein slit beams are projected;
(2) methods wherein regular patterns (for example, checks) are projected; and
(3) methods wherein ring patterns are projected The methods wherein ring patterns are projected are further categorized according to the mechanism used for the projection of the patterns, as follows:

(a) mechanisms using rotation mirrors
(b) mechanisms using cylindrical lens
(c) mechanisms scanning a laser beam in a circle
(d) mechanisms using x-y scanning-type mirrors.

Applications of Sensors with Spot or Slit Beam to Robots

Spot beam and slit beam sensors are used for robot welding (Japanese Patent Application First Publication No. 59(1974)-223817 "Microvector Control Method for Rim and Joint Follow Up" and "Example of Application of Sensor System for Robot Welding," Sekino, Welding Association Journal, [1991] Vol.60[1]: pp74–80). There are many examples of sensor systems to generate a robot trajectory in accordance with the features of the targeted configuration (see FIGS. 28A through 28C).

The end effector of the robot arm in FIG. 25 is equipped with a tool 100, a slit beam range sensor 101, and a two-dimensional position detection circuit 102. The robot independently determines a welding line, such as an L-shaped or V-shaped configuration, and moves along the determined feature. These systems convert the three-dimensional position Pc, which is observed by the coordinate system c fixed to the sensor 101, into a three dimensional position Pp, observed by the coordinate system p fixed to the robot as Pp=TPc. The conversion matrix T is determined by the position and orientation of the origin of the coordinate system c.

Two Dimensional Laser Pattern Generation Devices

FIG. 27 shows a conventional device for generating a two-dimensional laser ring pattern with the use of a rotation mirror. This device comprises a He-Ne laser 111, rotation mirrors 112 and 113, a lens 114, and a CCD imaging element 115. The rotation mirrors 112 and 113 deflect the laser beam LB emitted by the He-Ne laser 111 in the direction of qx and qy. The beam is directed at an object not indicated in the illustration. The scattered reflected light of the laser beam LB is applied to the object and forms an image at the CCD imaging element 115 via the lens 114. The image is used to determine the shape of the object. The light axis 116 of the lens 114 does not generally correspond to the radiation direction of the laser beam LB toward the object, because of the requirement for triangulation of the point illuminated by the laser beam LB.

FIGS. 28A to 28C explain the behavior of a scanning laser beam of a two-dimensional laser beam device shown in FIG. 27. In FIGS. 28A to 28C; z is the light axis of the laser beam, x shows the direction of deflection by the rotation angle qx of rotation mirror 112, y indicates the direction of deflection by the rotation angle qy of the rotation mirror 113, $z_1$ is the position of the rotation mirror 112, $z_2$ is the position of the rotation mirror 113, and $z_3$ and $z_4$ indicate the directions of the laser beam LB. In FIG. 28C, a and b show a deflection patterns traced by the laser beam in the x-y plane at positions $z_3$ and $z_4$. Although the pattern c traced at the position $z_3$ is circular, the pattern b at position $z_4$ is oval. This is caused by the difference in the distances between the mirrors and the object.

Applications of Sensors with Spot or Slit Beam for Robot

Robots which use conventional spot beams or slit beams utilize a pre-determined position or a position separated at a fixed distance in order to determine the welding points and the direction of the robot movement. Such robots cannot follow the changes in some configurations. For example, as shown in FIG. 26, the robot is unable to weld an object having an acute change in the angle. The feature images produced by the spot beam or slit beam are determined by two-dimensional image processing. The extracted features depend on heuristic image processing technique, thus requiring adjustment of the image processing parameters. This process takes a long time and requires a large amount of memory for one image.

Conventional two-dimensional laser pattern generating devices have the following problems.

(1) In a conventional device, shown in FIGS. 28A through 28C, the qx-qy directions of the rotation mirrors 112 and 113 do not coincide. Therefore, the change in the rotation angle for the two rotation mirrors must be large to obtain a circular deflection pattern trace. The deflection pattern trace becomes circular at a particular distance of the light axis while at other distances it becomes oval (see FIGS. 28A to 28C). When the pattern generated by the laser beam changes with the distance between the laser generation point and the object, triangulation produces a result indicating as though the orientation of the object's surface with respect to the light axis has changed. This resulted in measurement errors.

(2) These two-dimensional laser pattern generating devices are installed on positions such as the end effector of the robot's movable arm, together with observation equipment for projected patterns, and are used to inspect external appearances and to control work positioning. If the device operates while moving, the mechanical elements are subjected to acceleration, producing vibration in the support materials and movable mirrors of the rotation mirrors 112 and 113 in FIGS. 28A to 28C. The external forces created by the imbalance in the support point and the center of gravity for the support material and movable mirror causes unexpected mirror rotation. The stresses in the support material result in mirror translation and rotations in directions other than the correct rotation direction. Accurate pattern projection is impossible when the laser pattern is deformed by mechanical parts being subjected to such vibrations. Operating speed is reduced as observation and measurement cannot be conducted until the vibrations stop.

(3) The deflection producing structure is arranged so that the two rotation mirrors 112 and 113 cause deflections in the direction qx and qy. If such a large optical system is installed on the arm of a small robot, it will lower the robot arm's rigidity.

SUMMARY OF THE INVENTION

The present invention was made to resolve these problems mentioned above. The first objective of the present invention is to present an apparatus, which can easily follow changes in the shape of an object for extracting features of an object, and is able to perform fast three-dimensional measurements given a small memory and two-dimensional laser patterns. The extracting apparatus does not require parameter adjustments, and can easily respond to shape changes in the object. The second objective is to present a two-dimensional laser pattern generating device whose laser beam configuration patterns can remain unchanged despite changes in the distance between the laser generation point and the object, and can generate accurate laser pattern projections despite vibrations in the mirror support material or in the rotation mirrors, leading to a more compact optical system.

The above objectives are achieved in an apparatus for extracting feature patterns which projects a laser beam on objects with multiple surfaces. The device comprises a two-dimensional laser pattern generating device which can project a laser beam of any two-dimensional pattern; and a three dimensional position calculator. The positions of three-dimensional laser beam application points can be calculated by synchronizing laser emission and detection timing for the two-dimensional points. A three-dimensional position calculator determines surface parameters from the three-dimensional positions of several points. A pattern information generating device revises patterns in response to obtained parameters. A pattern recognition device detects configurational features of the object, based on the edges and top vertexes determined by more than one plane surface.

The three-dimensional position calculating device determines the surface parameters from the three-dimensional positions of points. The number of structural surfaces is confirmed each time a three-dimensional position is calculated, by comparing the surface parameters. The pattern information generating device classifies the surface according to multiple surface parameter groups calculated by the three-dimensional position calculating device. The projection pattern is revised in response to these results.

A first embodiment of the two-dimensional laser pattern generating device is provided with a semiconductor laser, a collimating lens to convert the optical laser beam from the semiconductor laser into a plane wave beam. Two rotation mirrors are rotatably supported, and two relay lenses are positioned between these rotation mirrors. A beam splitter is located on the laser beam optical path deflected by the rotation mirror, and an optical position detector determines the deflection position of the beam which was split by the beam splitter. The device of the present invention can control the laser beam deflection position by locating the two rotation mirrors in a conjugate image relationship using the relay lens of the device structure.

A second embodiment of the two-dimensional laser pattern generating device is provided with a semiconductor laser and a collimating lens which converts the diverging semi-conductor laser beam into a plane wave beam. The laser beam deflection is controlled by locating the collimating lens perpendicular to the light axis.

A third embodiment of the two-dimensional laser pattern generator has a semiconductor laser, a collimating lens, rotation mirror and lens. The collimating lens is placed in the conjugate optical system which forms a conjugate image in the rotation mirror. The rotation mirror is positioned in the rear, where the lens focuses.

The semi-conductor laser for each of these two-dimensional laser pattern generating devices can be a multi-beam laser, and in the embodiments presented, it is a 2-beam laser.

The devices of the above configurations calculate surface parameters from the three-dimensional positions on the object to which the laser beam is radiated. The points where the surface parameter changes are identified as feature points. The surface conditions are classified based on the number of these points. As the robot position and orientation are determined for each classification, the robot can easily respond to changes in the object configuration. The memory area can be reduced, and quick three-dimensional measurements can be performed because the welding lines and other lines are regarded as the intersecting lines of surfaces, and configuration extraction does not require parameter adjustment.

In the two-dimensional laser pattern generating device, two relay lenses are located between the two rotation mirrors to form a conjugate optical system. This enables similar configuration patterns drawn by the laser beam to remain unchanged despite changes in the distance. It is possible to generate accurate laser projection patterns despite vibrations in the mirror's support material and rotation mirrors, by detecting the laser beam deflection position using a beam splitter, an optical position detector and feedback control.

A more compact two-dimensional laser pattern generating device can be produced by moving the semi-conductor laser collimating lens in a perpendicular direction to the light axis. This avoids the problem of lowering the rigidity of the robot arm.

BRIEF DESCRIPTION OF THE DRAWINGS

In FIG. 10A is a sectional view, FIG. 10B is a side view and FIG. 10C is a plan view.

FIG. 15 is a time chart relating to FIG. 14.

FIGS. 21 and 22 is an explanatory chart showing the robot trajectory synthesis algorithm along edge line (Number 2).

FIG. 27 is a schematic perspective view showing a conventional two-dimensional laser pattern generating device and pattern observer.

FIG. 28A, FIG. 28B and FIG. 28C are illustrations of the two-dimensional scanning laser beam in the device shown in FIG. 27.

DETAILED DESCRIPTION OF THE PREFERRED EMBODIMENTS OF THE INVENTION

Detailed explanations of the present invention are given below and are based on the illustrated application embodiments.

Two-Dimensional Laser Pattern Generator

Figure 1:
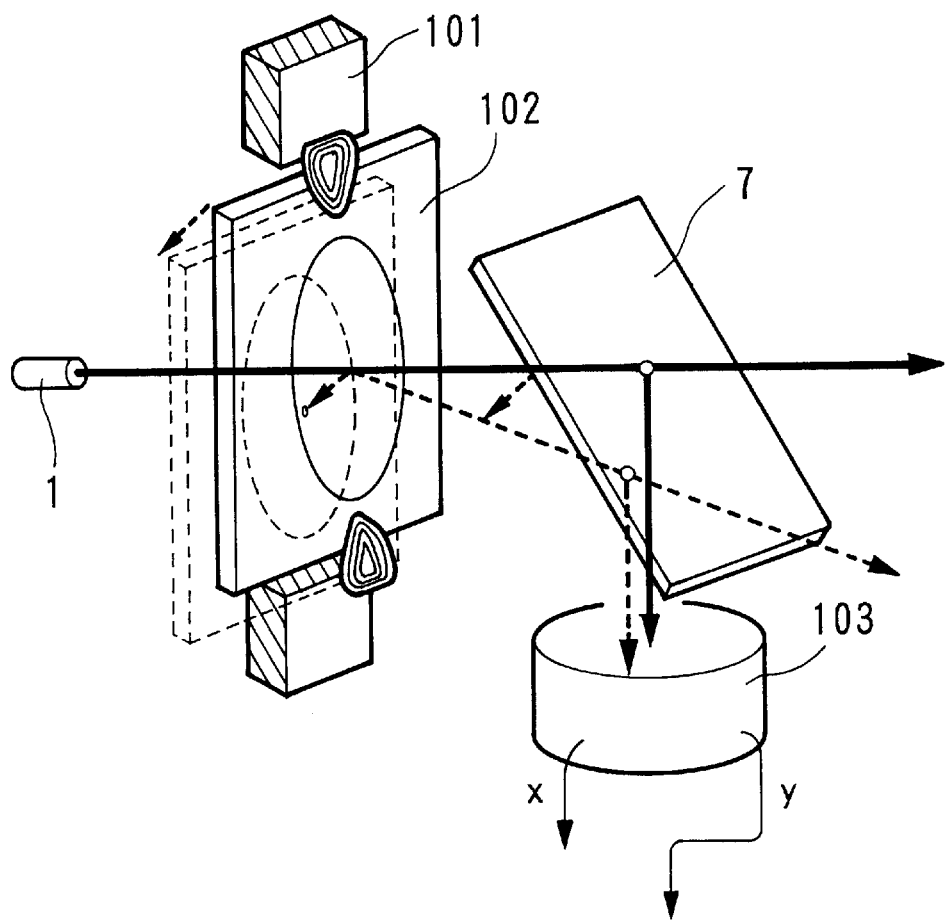
FIG. 1 is a schematic perspective view of an embodiment of the apparatus of the present invention.

FIG. 1 is a schematic illustration of a modification of the basic structure of the apparatus shown in FIG. 2, and will be explained later.

Figure 2:
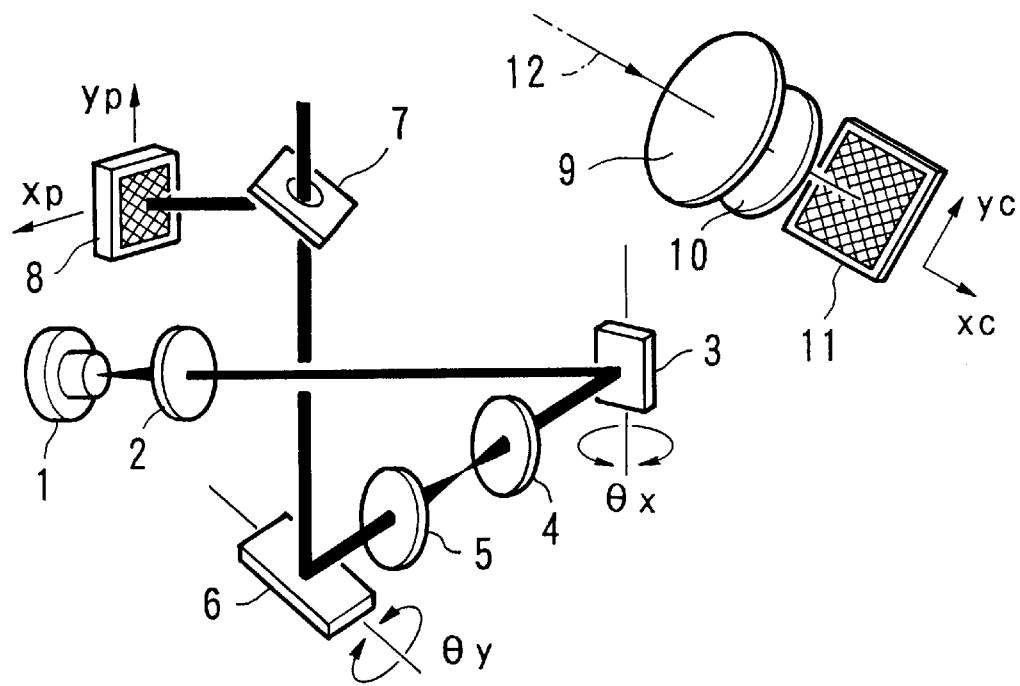
FIG. 2 is a schematic perspective view showing the structure of a two-dimensional laser pattern generating device and a pattern observation device of the present invention.

FIG. 2 shows the basic structure of the two-dimensional laser pattern generating device of the present invention, as well as the pattern observer device. The two-dimensional laser pattern generator comprises: a semiconductor laser 1, collimating lens 2, rotation mirror 3, relay lens 4, relay lens 5, rotation mirror 6, beam splitter 7, and a PSD (Position Sensing Device) elements 8. The pattern observer comprises: a lens 9, an optical filter 10 having a wave length of the semiconductor laser 1 in the band pass zone, and a PSD image sensing element 11 which detects the radiated position on the object.

A plane wave laser beam LB, generated by a semiconductor laser 1 and collimating lens 2, is deflected in the direction of qx by a rotation mirror 3. The beam passes through two relay lenses, 4 and 5, and is deflected in the direction of qy by a rotation mirror 6. The first relay lens 4, is positioned at a distance from the rotation mirror 3 which is equal to the rear focal distance of the first relay lens 4. The second relay lens 5 is positioned at a distance from the relay lens 4 which is equal to the sum of the front focal distances of both relay lenses 4 and 5. Rotation mirror 6 is positioned at a distance from the second relay lens 5 which is equal to the rear focal distance of the relay lens 5. A conjugate optical system is thus composed where the image from rotation mirror 3 is formed at the position of rotation mirror 6.

The laser beam LB, reflected/deflected by the rotation mirror 6, enters the PSD 8 after part of the beam has been divided by the beam splitter 7. The shape of the pattern produced by the laser beam LB does not depend on the distance between the rotation mirror 6 and the observation position, therefore, it is possible to monitor the images produced by the laser LB through the PSD 8.

The scattered reflection light of the laser beam LB, radiated onto the object, is focussed at PSD image sensor 11 by lens 9 and may be used to observe the shape of the image.

The light axis 12 of the lens 9 will not, in general, coincide with the object illumination direction of the laser beam LB, because of the requirements for conducting triangulation measurements of the illuminated points on the object. Optical filter 10 is designed to pass through only the wave length band of the laser beam LB, thereby reducing the noise from other light sources such as the background light.

Figure 3:
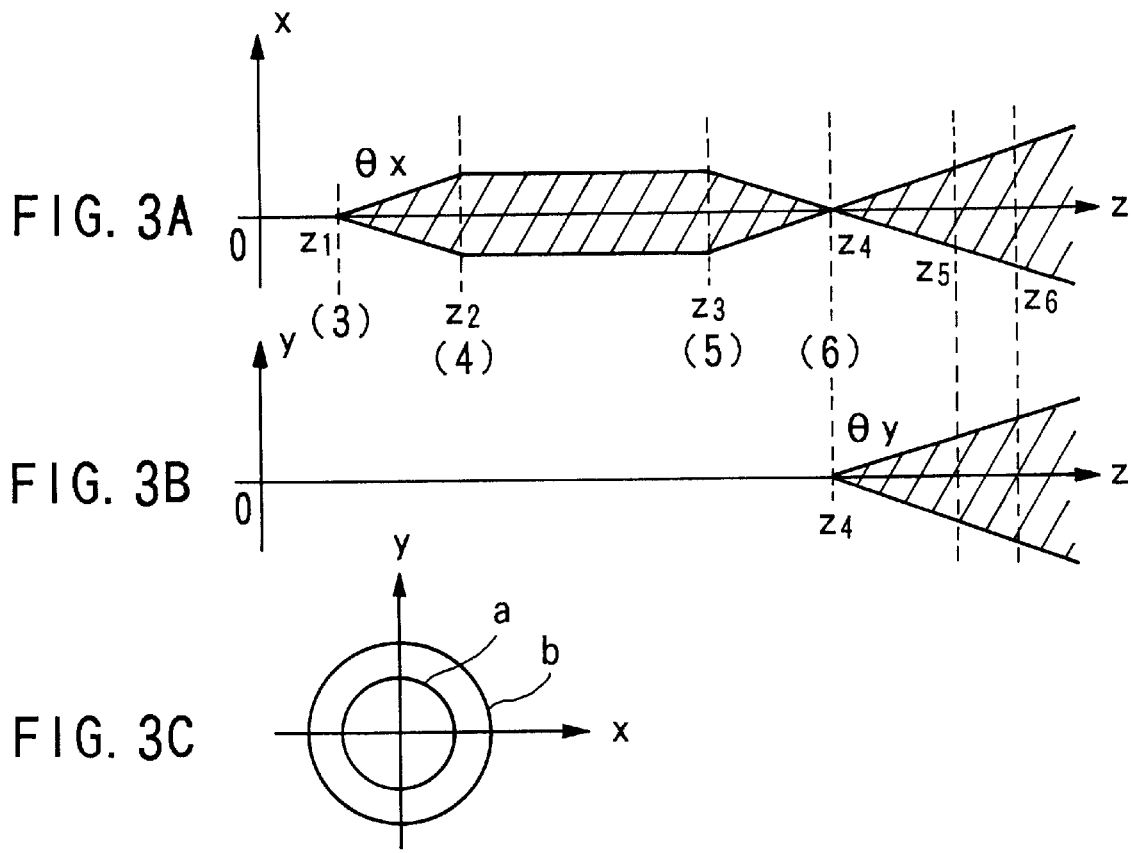
FIG. 3A through FIG. 3C show the scanning actions of the two-dimensional laser beam in the device shown in FIG. 2.

FIGS. 3A through 3C explains the scanning beam axis of the two-dimensional laser beam used in the device shown in the diagram, FIG. 2. In the figures, z is the direction of the light axis of the laser beam; x is the direction of deflection caused by the rotation of rotation mirror 3 through angle qx; and y is the direction of deflection caused by the rotation of the rotation mirror 6 through angle qy. Point $z_1$ refers to the position of rotation mirror 3; $z_2$ refers to the position of relay lens 4; $z_3$ refers to the position of relay lens 5; $z_4$ refers to the position of rotation mirror 6, and $z_5$, $z_6$ refer to some directions of the light axis of laser beam LB. In FIG. 3(C), a and b refer to the traces of the deflection pattern described by the laser beam LB directed in the plane x-y, at points $z_5$ and $z_6$. The traces of the deflection patterns a and b are circular at both points $z_5$ and z6. This is because the rotation mirrors 3 and 6 are optically conjugate mirrors rotating in the direction of qx-qy, the shape of the patterns drawn by the laser beam will not be influenced by the distances on the light axis.

Figure 4:
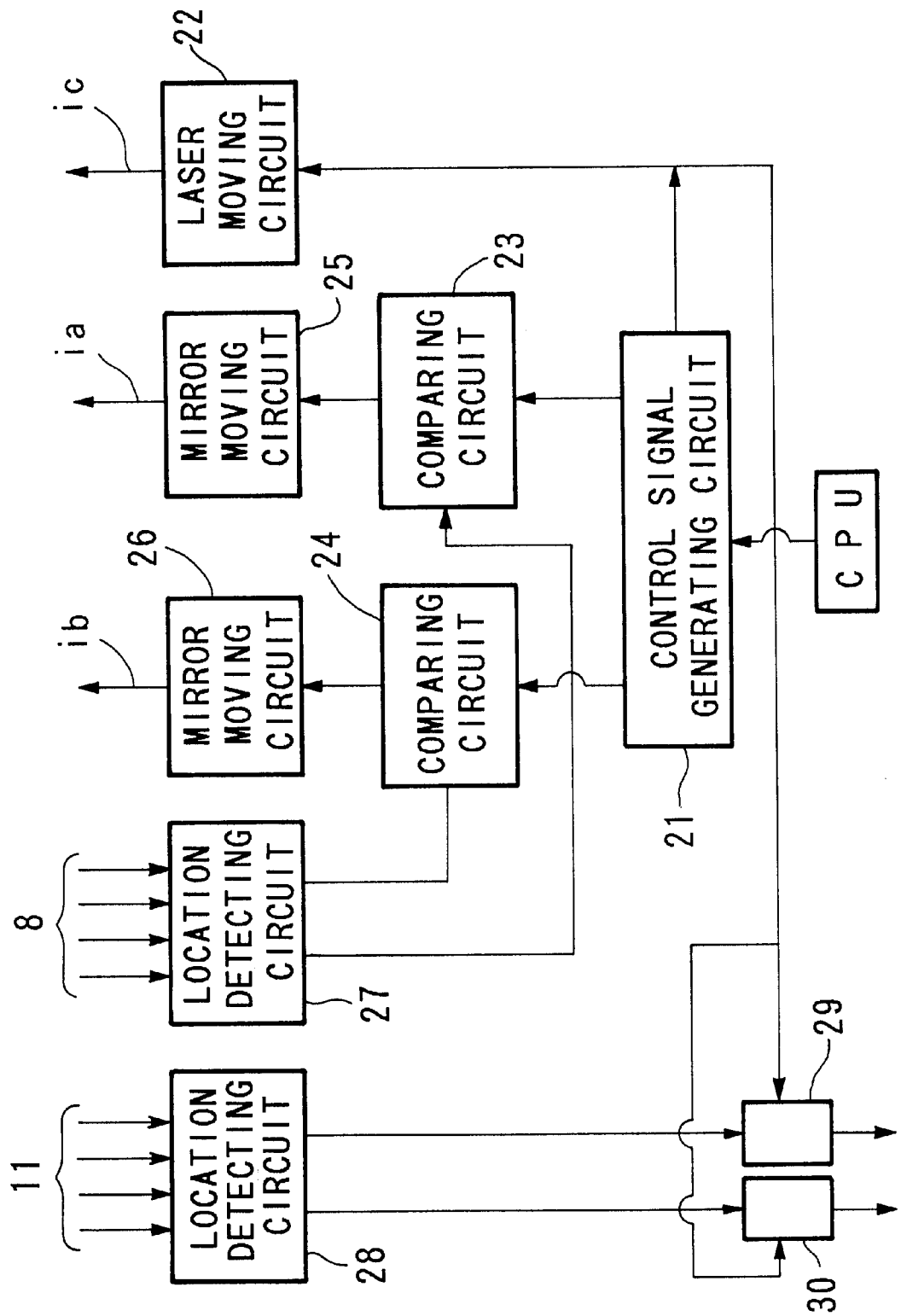
FIG. 4 is a block diagram showing a part of the control circuit of the two-dimensional laser pattern generating device and the pattern observation device shown in FIG. 2.

FIG. 4 is a block diagram to show the configuration of a part of the control circuit for the two-dimensional laser pattern generating device and the observation device. It comprises: a control signal generating circuit 21; a laser operating circuit 22; comparison circuits 23 and 24; mirror operating circuits 25 and 26; position detection circuits 27 and 28; and sample/hold circuits 29 and 30.

The drawing pattern of the two-dimensional laser beam is input into the control signal generating circuit 21 as shape data by the central processing unit CPU (not shown). Next, the magnitude of the rotational angle for the rotation mirrors is input from control signal generating circuit 21 via comparison circuits 23 and 24 into mirror operating circuits 25 and 26, and rotation mirrors 3 and 6 are driven and controlled by mirror currents $i_a$ and $i_b$. Here, the output signals from PSD 8 which monitors similar shape patterns drawn by the laser beam LB are transformed by position detecting circuit 27 into angular components of rotation for the rotation mirrors 3 and 6, and compared with the shape data from the CPU in comparison circuits 23 and 24, then feedback control is performed so as to minimize the deviations. It thus becomes possible to correct for errors induced by such events as the entire apparatus vibrating to cause vibrations in the rotations mirrors.

On the other hand, laser operating circuit 22 is a circuit which supplies a laser current $i_c$ which controls the output of semiconductor laser 1, and the control of continuous or pulsed illumination is performed by control signal generating circuit 21. At this time, the output signals of the image formed on the PSD image sensing element 11 by the lens 9 from scattered and reflected light of the laser beam LB irradiating an object is outputted from the position detecting circuit 28 as two co-ordinate components in two directions. Data is output from sample/hold circuits 29 and 30 only when semiconductor laser 1 is flashing on and off.

Figure 5:
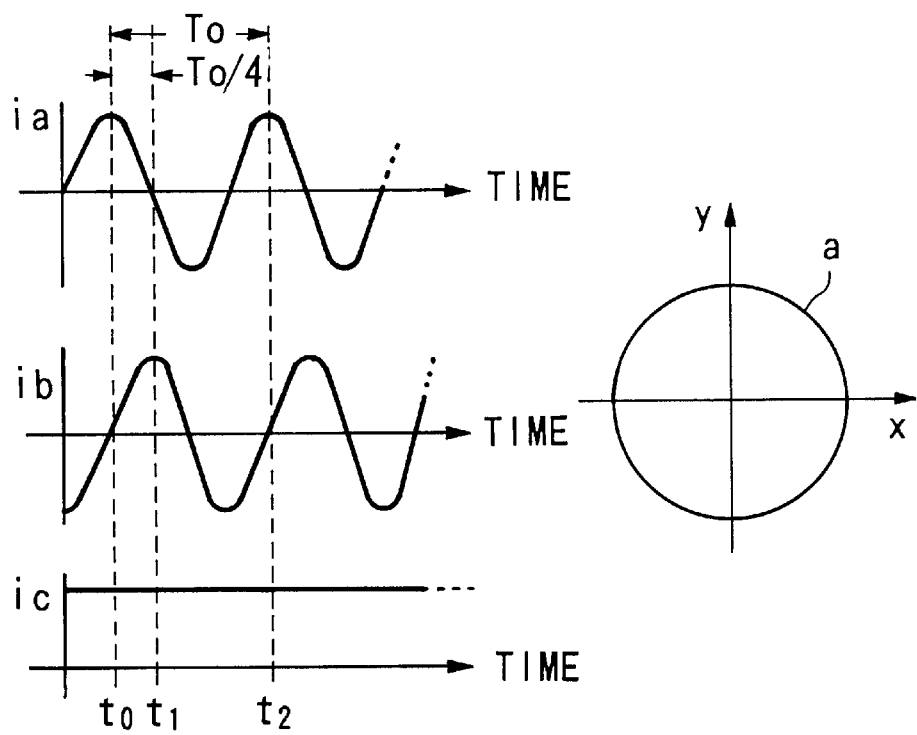
FIG. 5 is an example of the control circuit operation and generation patterns in FIG. 4.
Figure 6:
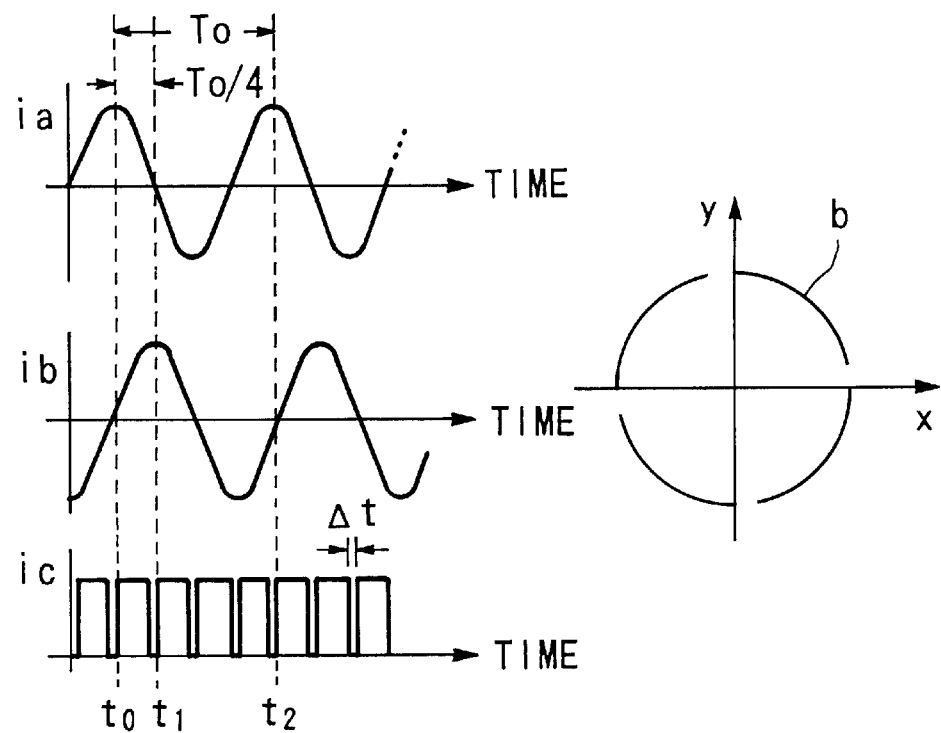
FIG. 6 is an example of the control circuit operation and generation pattern in FIG. 4.

FIGS. 5 through 8 are drawings which explain the action of the aforementioned control circuit and the patterns generated by the two-dimensional laser beam. In FIG. 5, mirror currents $i_a$ and $i_b$ have a sine wave signal of period $T_0$ and phase difference $T_0/4$, and by providing continuous illumination the laser current $i_c$ is supplied continuously to enable a continuous laser illumination, it becomes possible to obtain a circular pattern drawn by the laser beam. In FIG. 6, mirror currents $i_a$ and $i_b$ have a sine wave signal of period $T_0$, and phase difference $T_0/4$, and by supplying intermittent laser current $i_c$, and providing illumination with period $T_0/4$ and stop time Dt, it becomes possible to obtain a pattern made by four circular arcs drawn by the laser beam.

Figure 7:
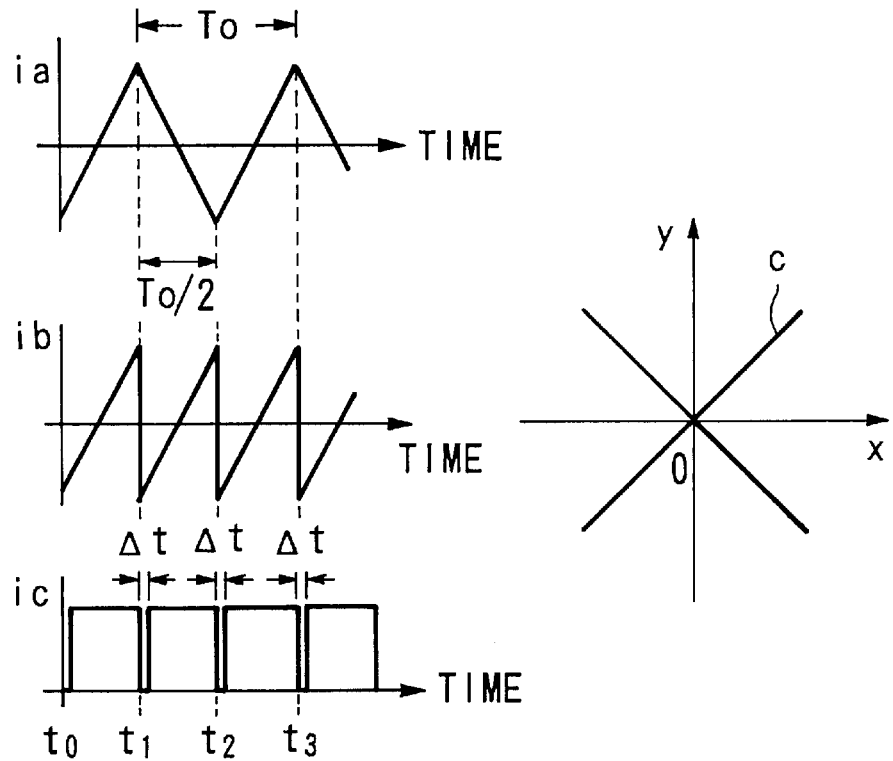
FIG. 7 are examples of the control circuit operation and generation pattern in FIG. 4.
Figure 8:
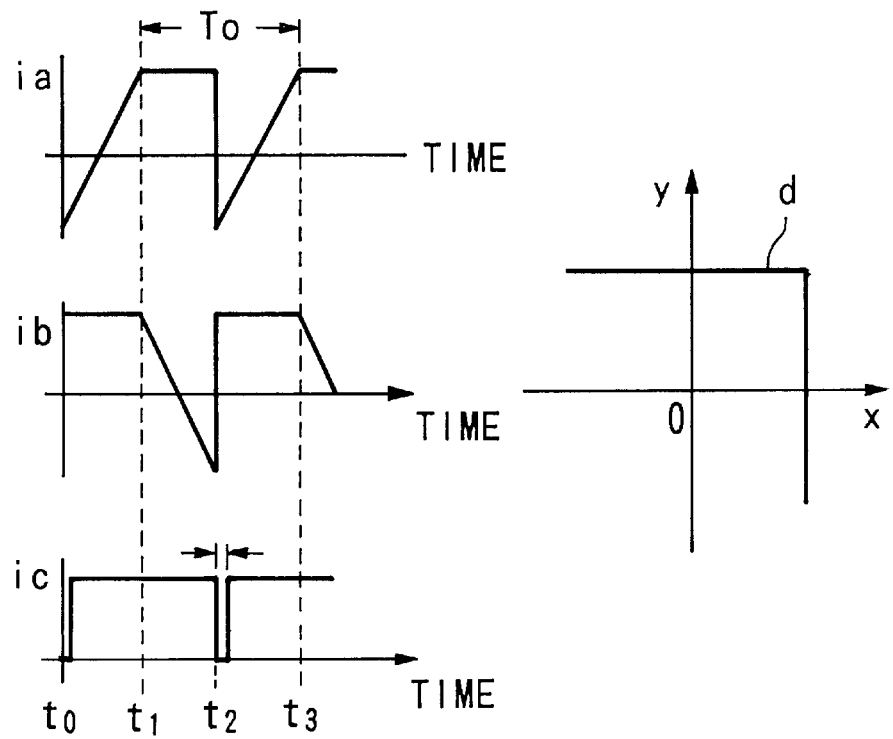
FIG. 8 shows examples of the control circuit operation and generation pattern in FIG. 4.

In FIG. 7, mirror current $i_a$ is a triangular wave signal with period $T_0$, and mirror current $i_b$ is a sawtooth wave signal with period $T_0/2$, and by making the laser current $i_c$ to intermittently illuminate with period $T_0/2$ and stop time Dt, it becomes possible to obtain an X-shaped pattern drawn by a laser beam. In FIG. 8, mirror currents $i_a$ and $i_b$ are a vertical tail-shaped signals with period $T_0$ and opposing phase relation-ships, and by making the laser current $i_c$ to provide intermittent illumination with period $T_0$ and stop time Dt enable a reversed L-shaped pattern to be drawn by the laser beam. As described above, it is possible to produce the desired pattern drawn by a laser beam by controlling mirror currents $i_a$ and $i_b$, and laser current $i_c$.

Figure 9:
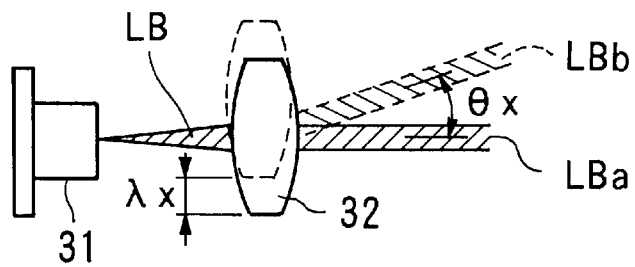
FIG. 9 is a schematic illustration of the structure of the deflection mechanism of the lens mobile system and its operations as relating to the present invention.
Figures 10A, 10B:
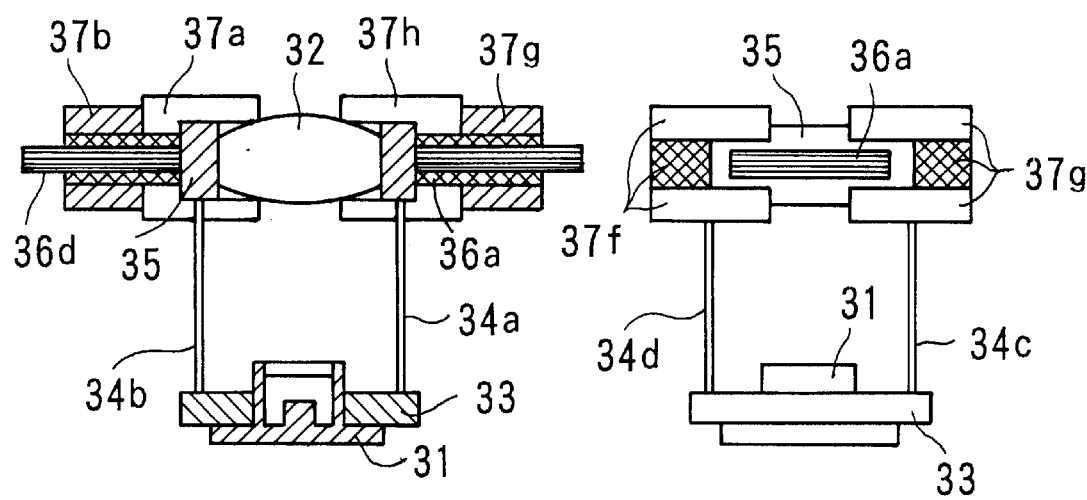
FIG. 10A, FIG. 10B and FIG. 10C show the details of the deflection mechanism.
Figure 10C:
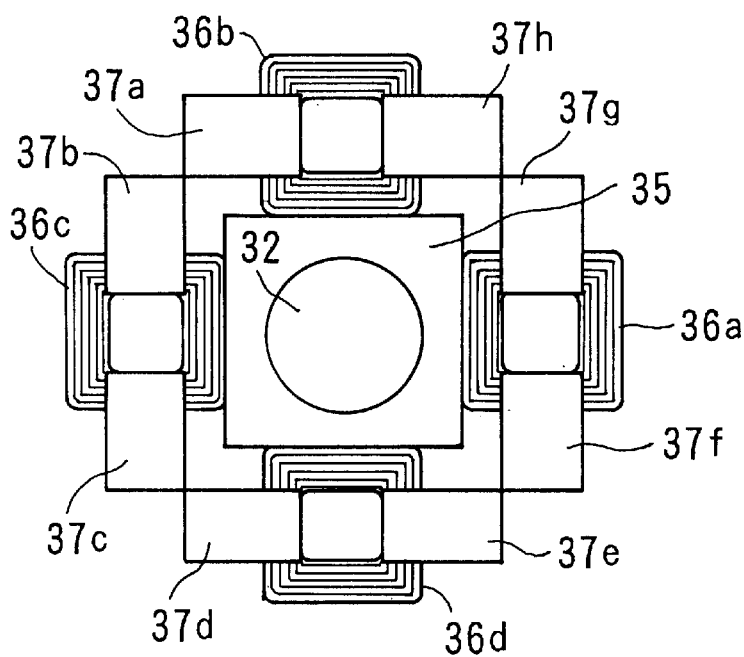

Next, FIGS. 9 and 10 show examples of a two-dimensional laser pattern generating device which deflects laser beams by moving a collimating lens, comprising semiconductor laser 31; collimating lens 32; support 33; supporting springs 34; lens holder 35; moving coil 36; and magnetic circuit 37. FIG. 1 is a perspective diagram which show this configuration is a schematic manner. Laser beam LB emerging from the semiconductor laser 31 is transformed into a plane wave beam by collimating lens 32, and due to the position of collimating lens which has a light axis coinciding with that of the semiconductor laser 31, emergent beam LBa advances straight ahead. When collimating lens 32 moves a distance dx in a direction perpendicular to the light axis, emergent beam LBb is deflected from the light axis by an amount qx. Here, if f is the focal length of collimating lens 32, then the following relationship holds: tan qx=dxIIf.

The mechanism which moves the collimating lens 32 is constructed so as to move the collimating lens 32 in two directions perpendicular to the light axis. Collimating lens 32 is supported by a lens holder 35, and this lens holder 35 is attached by four supporting springs 34a through 34d to support 33 which holds semiconductor laser 31 fixed, thereby allowing it to move freely in two directions, it is disposed such that a plane wave beam can be obtained. Moving coils 36a through 36d which are attached, mounted and connected, respectively, to the four sides of the lens holder 35 comprise a motor by virtue of magnetic circuits 37a through 37h on the fixing side, and by controlling the current passing through the moving coil 36, collimating lens 32 can be driven in two directions perpendicular to the light axis.

Here, each magnetic circuit 37 is disposed such that the moving coils 36 are interposed between yokes, and constructed such that a magnetic field is imposed in a direction perpendicular to the coil, and is fixed in place by a holding part (not illustrated) which is connected to the support. Supporting springs 34 are made of wire, and are of a construction which enables flexural deformation in directions perpendicular to the light axis of the lens. In this embodiment, four-piece wire springs were used, but it is also permissible to use ball bearing sliding parts in a construction which provides freedom in the directions perpendicular to the light axis. It is also possible to use moving magnet-type electromagnetic mechanisms or piezoelectric elements for driving. Thus, as the above description shows, it is an advantage that the mechanism which drives the collimating lens in directions perpendicular to the light axis can be made small.

Figure 11:
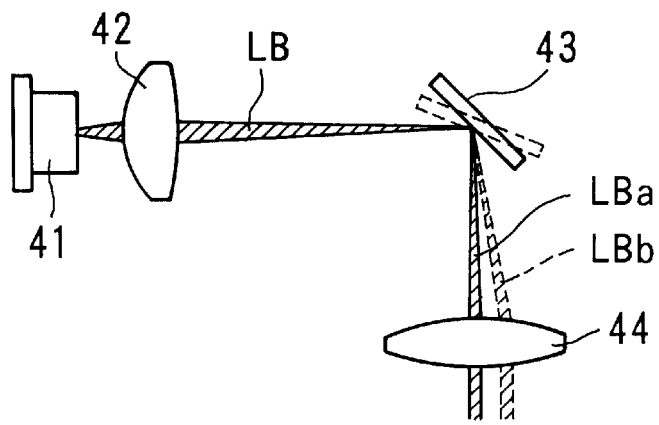
FIG. 11 is a schematic illustration of the structure of the deflection mechanism of the lens rotation system and its operations as relating to the present invention.
Figure 12A:
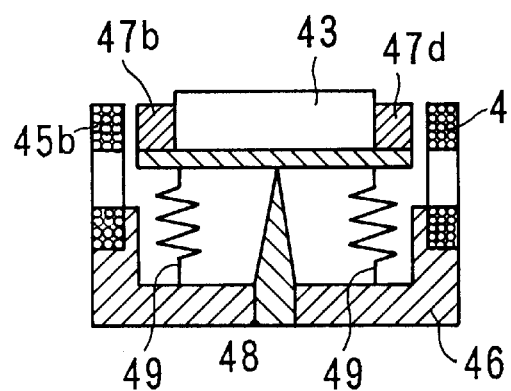
FIG. 12A, FIG. 12B and FIG. 12C show sectional view, side view, and plan view, respectively of the deflection mechanism.
Figure 12B:
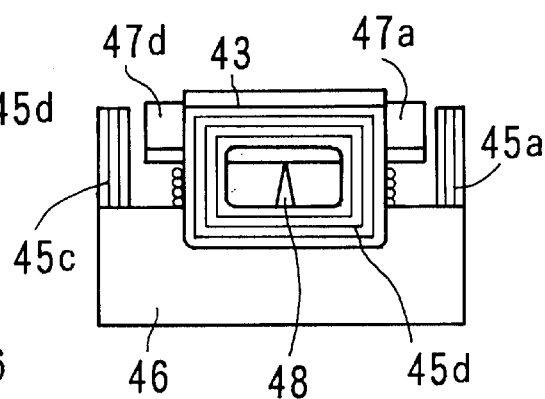
Figure 12C:
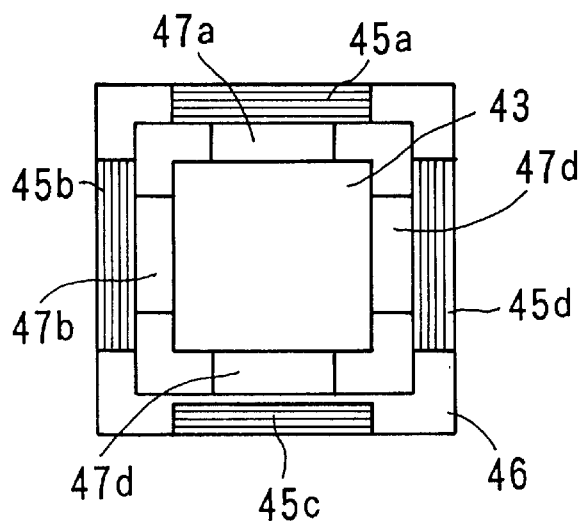

FIGS. 11 and 12 show examples of a two-dimensional laser pattern generating device which deflects the laser beam by virtue of the rotational movement of one rotation mirror, and comprises semiconductor laser 41; a collimating lens 42; a rotation mirror 43; a lens 44; a coil 45; a support 46; a movable magnet 47; a supporting needle 48; and supporting springs 49.

Semiconductor laser 41 and the collimating lens 42 are disposed such that the laser beam LB is condensed (collimated) on rotation mirror 43, and such that reflected beams LBa and LBb from rotation mirror 43 are transformed into plane wave beams by lens 44. Namely, because the semiconductor laser 41 and the rotation mirror 43 are disposed at conjugate image positions, and rotation mirror 43 is disposed at the rear focal point of the lens 44, reflected beams $LB_a$ and $LB_b$ are always radiated parallel to the light axis after passing through lens 44. As a result, there is the advantage that conventional variations in the size of the pattern drawn by the laser beam according to the light axis length can be prevented.

Figure 13A:
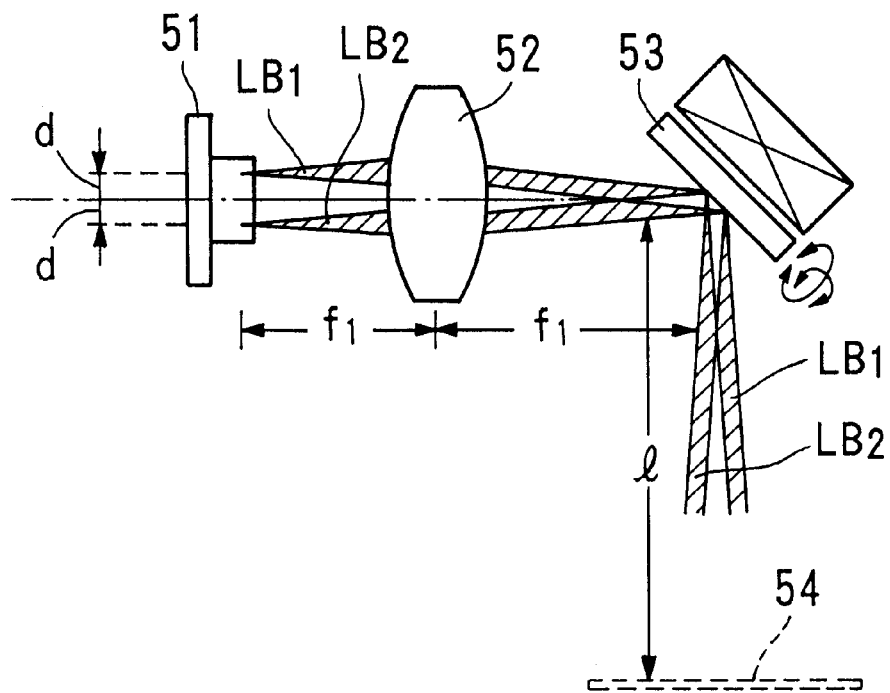
FIG. 13A, FIG. 13B and FIG. 13C show a schematic illustration of generated patterns, of the structure of the two beams, two-dimensional laser pattern generating device and its operation.
Figure 13B:
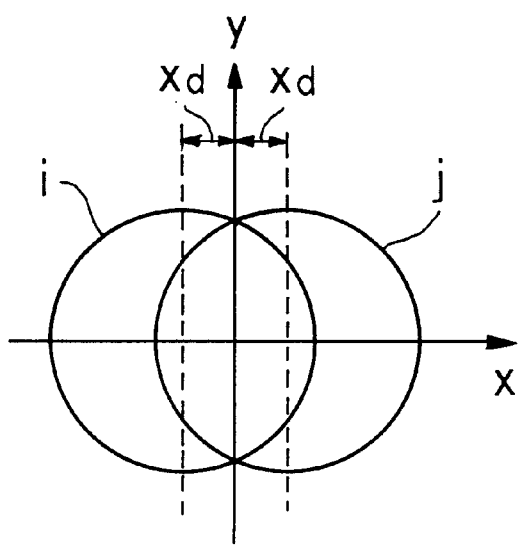
Figure 13C:
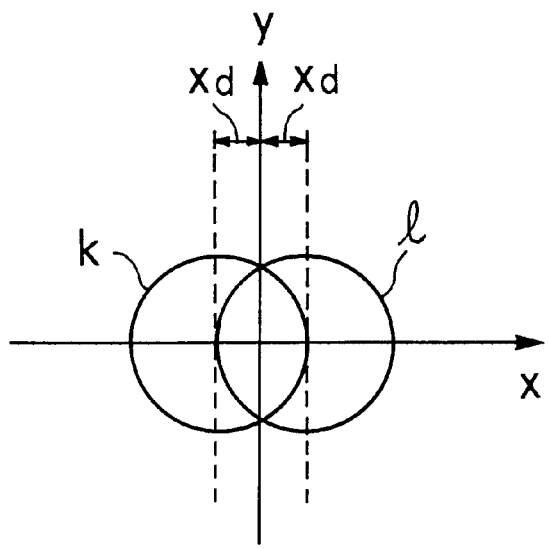

As FIGS. 13A through 13C illustrates, rotation mirror 43 can move obliquely at will, with a supporting needle 48 in its center and supporting springs 49 on its periphery, and is rotated and controlled by a motor comprising movable magnets 47 fitted to the four sides of rotation mirror 43 and a coil 45 fixed to a support 46. The construction of this motor is basically the same as the embodiment in FIGS. 10A through 10C, but in this case, the movable magnet 47 is moved by the coil 45.

FIGS. 13A through 13C illustrates an example of a two-dimensional laser pattern generating device which used two laser beams, comprising a 2-beam semiconductor laser 51, a collimating lens 52, a rotation mirror 53 and a screen 54. Laser beams $LB_1$ and $LB_2$ from the 2-beam semiconductor laser 51 are transformed into plane wave beams by the collimating lens 52, then transformed into reflected beams $LB_1$ and $LB_2$ which are deflected in the qx–qy direction by the rotation mirror 53.

FIGS. 13B and 13C illustrate irradiation patterns on screen 54 for reflected beams $LB_1$ and $LB_2$, and are examples of differing sizes of rotational angle qx–qy for the rotation mirror 53. Setting the spacing between the two beams of the semiconductor laser 51 as 2d, the focal length of the collimating lens 52 as $f_1$, and the spacing between the rotation mirror 53 and the collimating lens 52 as $f_1$, the spacing between the traces of reflected beams i and j on screen 54, and the spacing between reflected beams k and l will be independent of the irradiated pattern and will be separated only by a distance 2×d. If the distance from rotation mirror 53 to the screen 54 is taken to be 1, then a relationship xd=d×1Πf$_1$ is established. Thus, by using a multiple beam semiconductor laser as a light source, it becomes possible to simultaneously produce similar patterns at a fixed distance apart, and when combined with light source illumination control, complex patterns can be rapidly produced.

A Device for Extracting Shape Features Using Pattern Light

Figure 14:
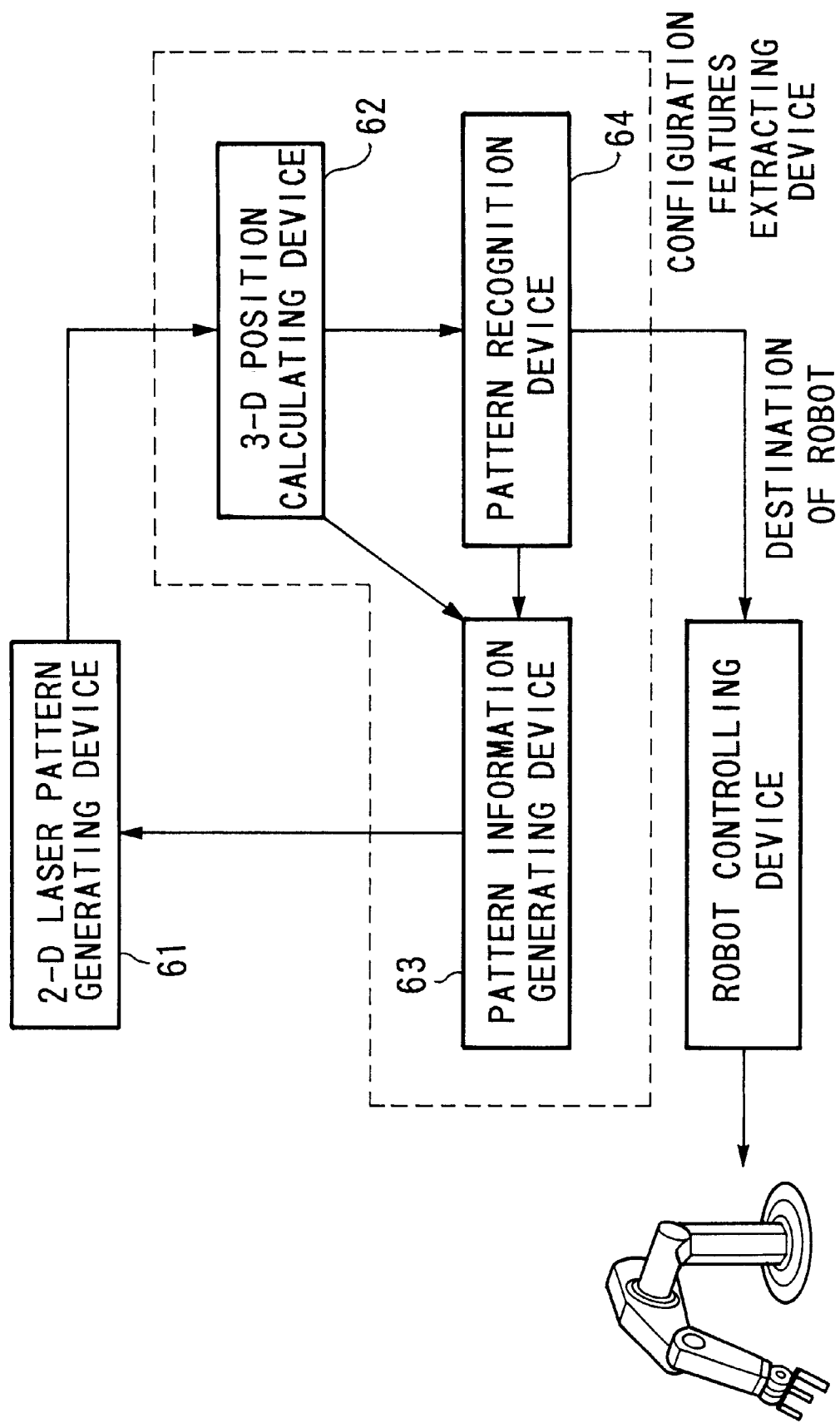
FIG. 14 is a block diagram showing the configurational feature extracting device using two-dimensional laser patterns.
Figure 16A:
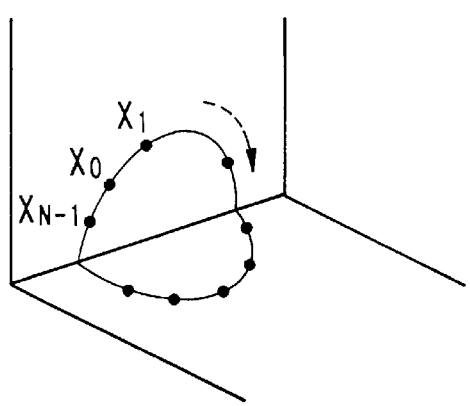
FIG. 16A through FIG. 16E are explanatory illustrations of extracting features for multiple surfaces (Number 1).
Figure 16B:
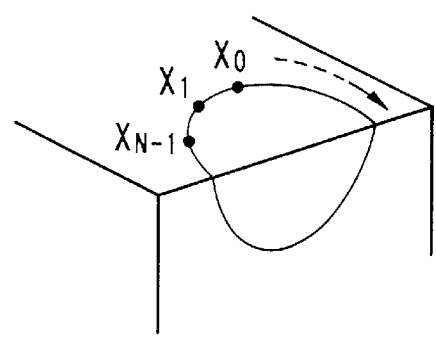
Figure 16C:
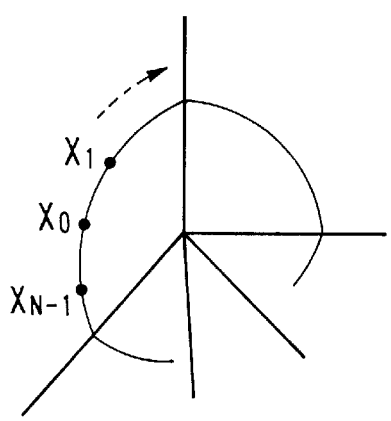
Figure 16D:
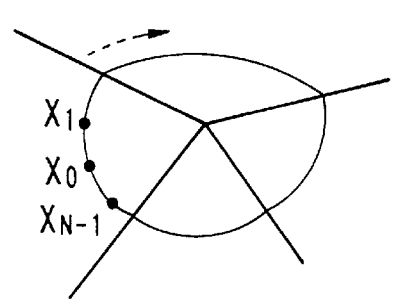
Figure 16E:
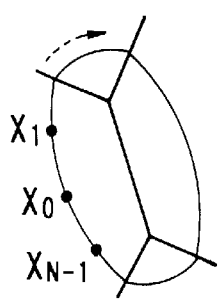

As illustrated in FIG. 14, the device for extracting shape features using the two-dimensional laser pattern of the present invention comprises a two-dimensional laser pattern generating device 61, a three-dimensional position calculating device 62, a pattern information generating device 63 and a pattern recognition device 64.

The two-dimensional laser pattern generator device 61 is a device for projecting laser light in the desired two-dimensional pattern, using the aforementioned device.

The three-dimensional position calculating device 62 detects laser light (feed back controlled by the directions of the laser projection ($x_p$, $y_p$) which are observed by PSD 8 of FIG. 2) is detected on the PSD image sensing element 11 of FIG. 2 as point ($x_c$, $y_c$). The three-dimensional position (V=(x, y, z)) of the object which was irradiated by the laser light is calculated from the projection relationship between the point ($x_p$, $y_p$) which can be determined from the layout of the laser generating device and the three-dimensional position, and the projection relationship between ($x_c$, $y_c$) and the three-dimensional position. When ($x_c$, $y_c$) cannot be detected, either no object is present in the direction of the projected laser light, or the reflected light is not being received by the PSD element image sensing element 11 of FIG. 2.

Further, by measuring the points, the positions of the surfaces in which these points are present are calculated. For example, when the surface is planar, planar parameters $P1=(a_1, a_2, a_3)$ ($a_1 \cdot x + a_2 \cdot y + a_3 \cdot z = 1$) in which three points exist is determined from the three-dimensional positions ($V_{1-2}$, $V_{1-1}$, $V_1$) of three points which do not lie in a straight line. By increasing the number of points, it is possible to obtain results even when the surface is a two-dimensional curved surface.

Figure 17:
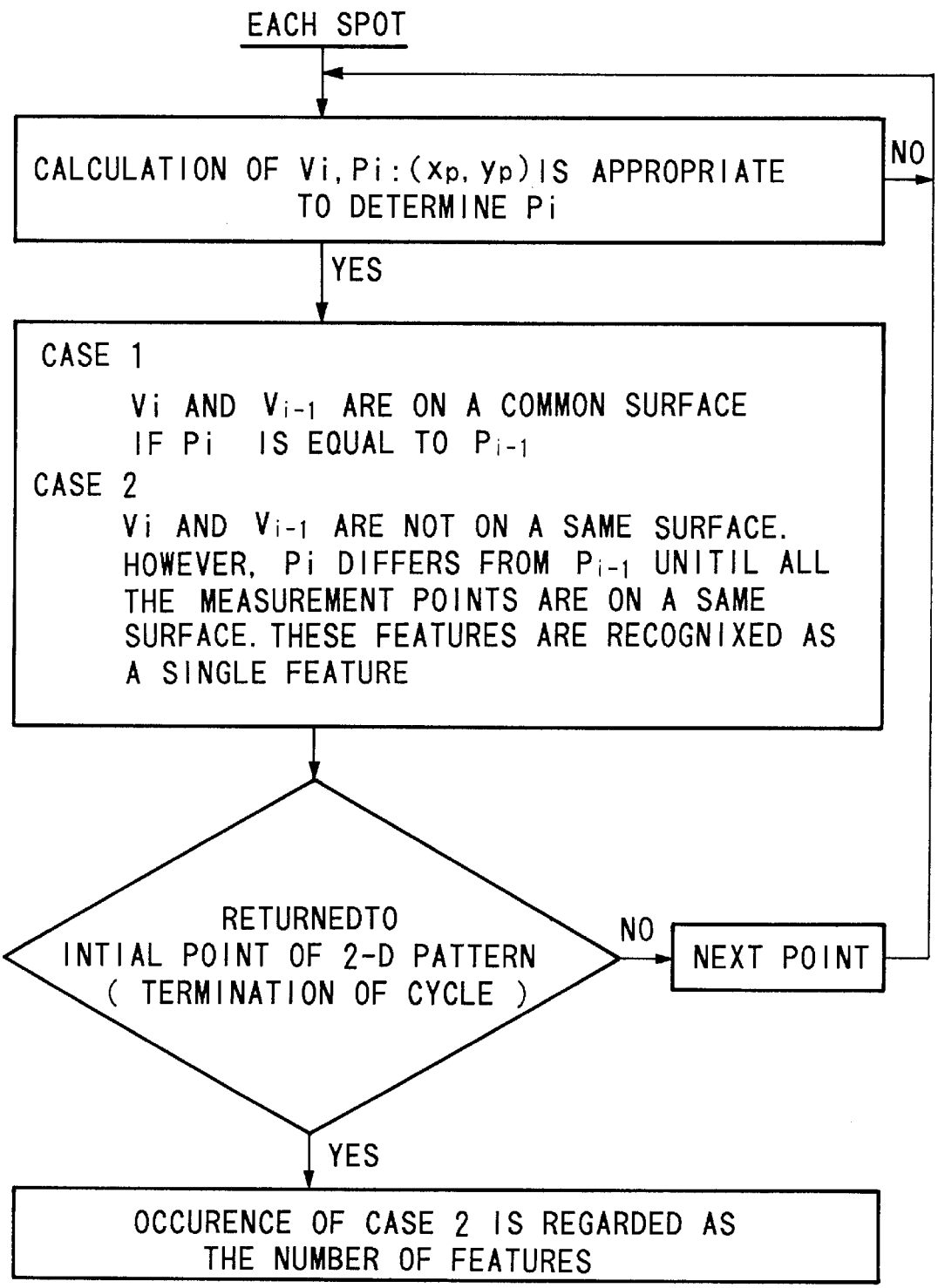
FIG. 17 is an explanatory chart of extracting features for multiple surfaces (Number 2).

FIGS. 16 and 17 show an example of a three-dimensional calculation, where for a three-dimensional position $V_1$ at a certain measurement point in time $t_1$, parameter $P_1$ for the new surface is determined using three-dimensional positions of a number of points including $V_1$. If parameter $P_1$ and parameter $P_{1-1}$ are identical, then the points which include $V_1$ and $V_{1-1}$ used to calculate parameter $P_1$ and parameter $P_{1-1}$ lie on the same surface. Conversely, if parameter $P_1$ and parameter $P_{1-1}$ are different, then $V_1$ lies on a different surface from the other points including $V_{1-1}$. By taking the point which changes the surface parameter as the feature point of the configuration, the surface parameters corresponding to the points which comprise the two-dimensional pattern are obtained, and the feature point is determined to be that which are formed by a number of surfaces.

Figure 18:
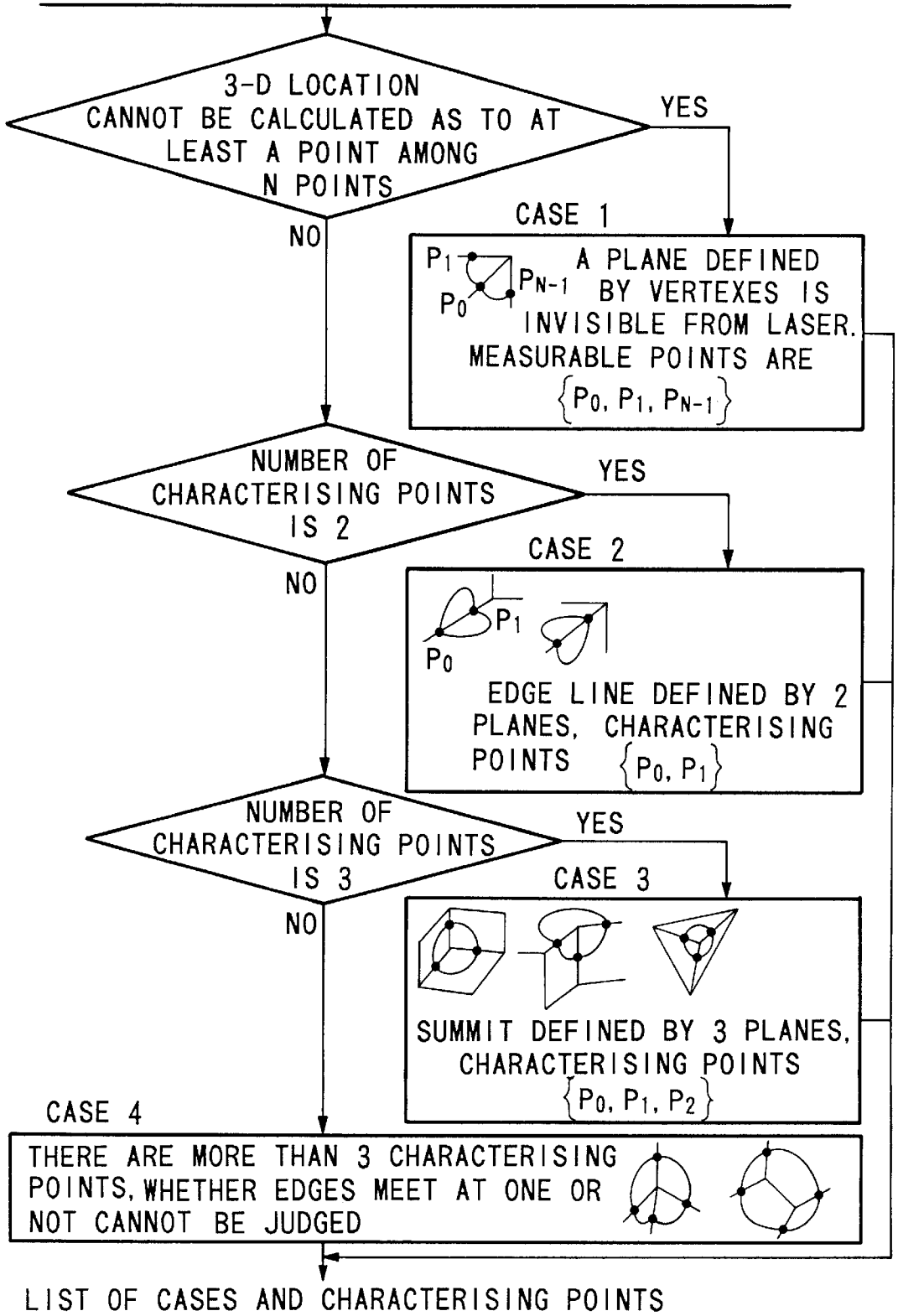
FIG. 18 is an explanatory chart showing the features extracted at the edge lines and top points of multiple surfaces.

As explained in FIG. 18, pattern recognition device 64 classifies the surfaces into the following four cases based on the number of feature points outputted from the three-dimensional position calculating device 62.

(Case 1)
A part of the two-dimensional pattern is projected onto a vertex of a convex surface formed by the surfaces,
(Case 2)
The entire two-dimensional pattern is projected onto an edge line which is formed by two surfaces,
(Case 3)
The entire two-dimensional pattern is projected onto a vertex formed by three surfaces,
(Case 4)
The two-dimensional pattern is projected onto a vertex or vertexes formed by the surfaces.

Pattern information generating device 63 varies the projection pattern based on the results from the three-dimensional position calculating device 62 and the pattern recognition device 64. It is essential, for instance, that the points which are used by the three-dimensional position calculating device 62 in determining the surface parameters do not lie on a straight line. When the three-dimensional parameter Vi is located in a position that does not satisfy the conditions to determine the surface parameter, the command parameters ($x_p$, $y_p$) for the direction of the laser projection is changed so that the conditions are fulfilled. In Case 4, the pattern recognition device 64 changes projection patterns. Reducing the size of the pattern to be projected, Case 4 is defined as either one of Case 1, Case 2 and Case 3, or it is defined as a vertex formed by surfaces configured to the required precision.

Figure 19:
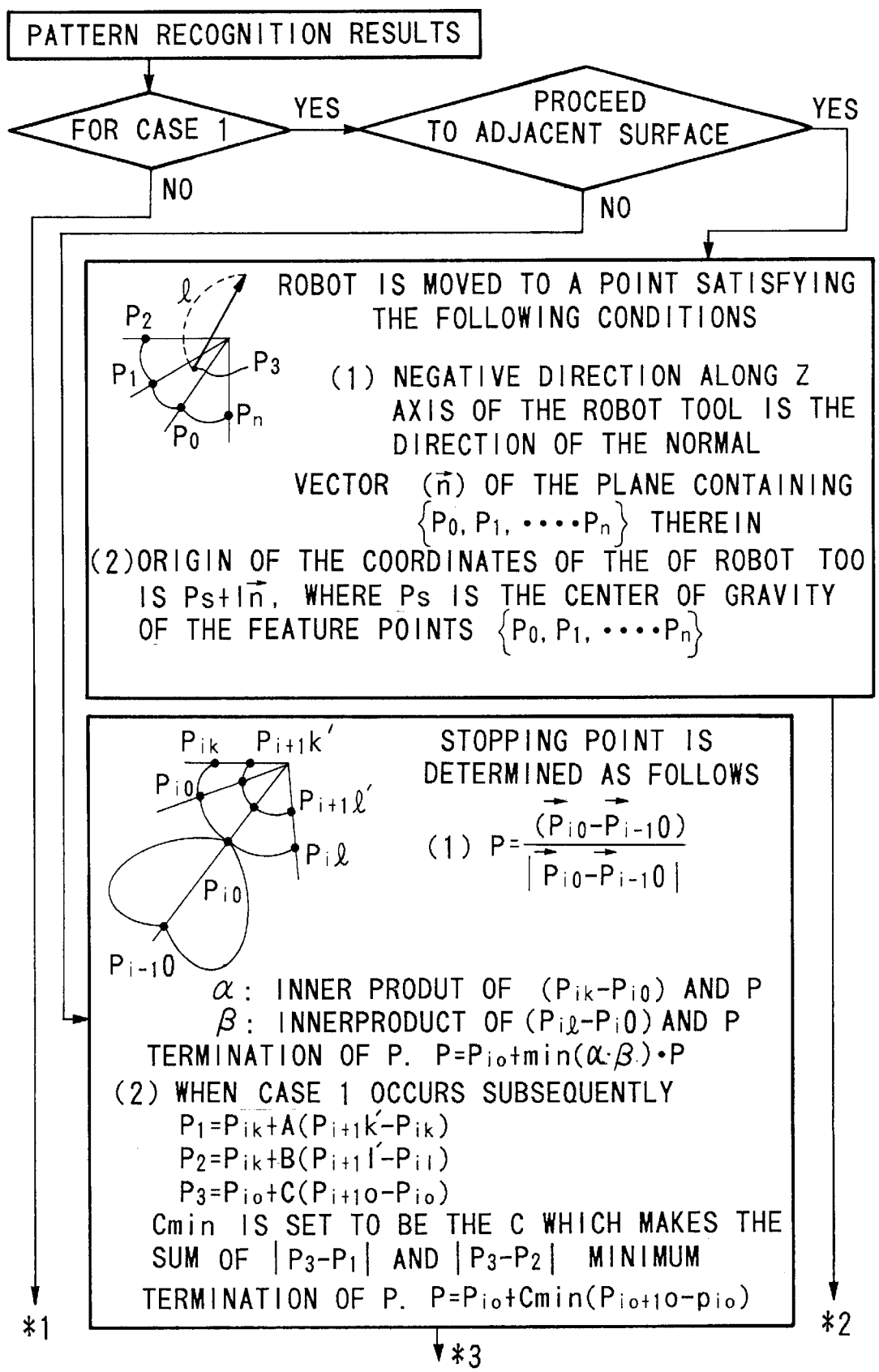
FIG. 19 and FIG. 20 are explanatory charts of the robot trajectory generation algorithm along an edge line Number 1).
Figure 20:
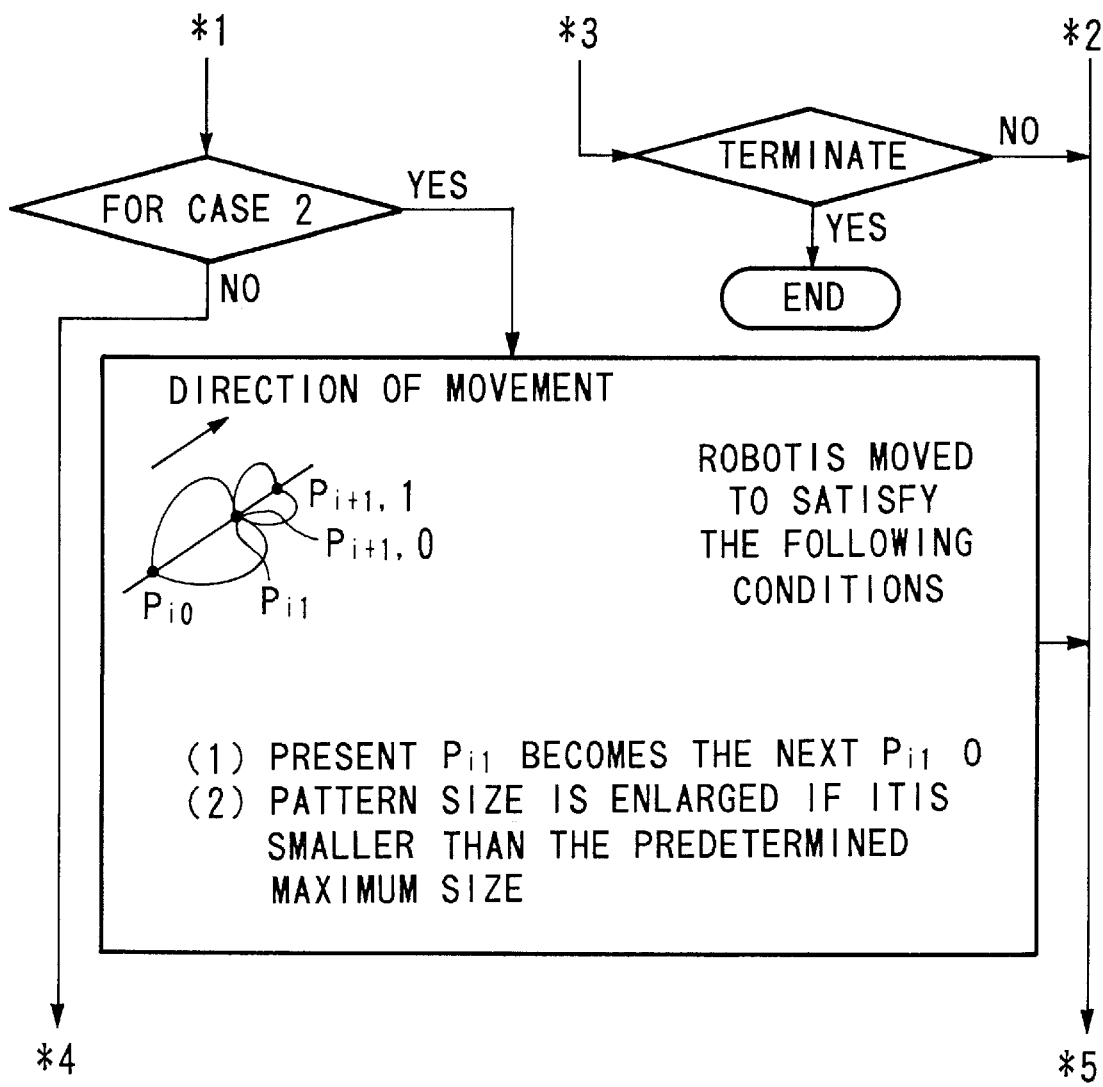
Figure 21:
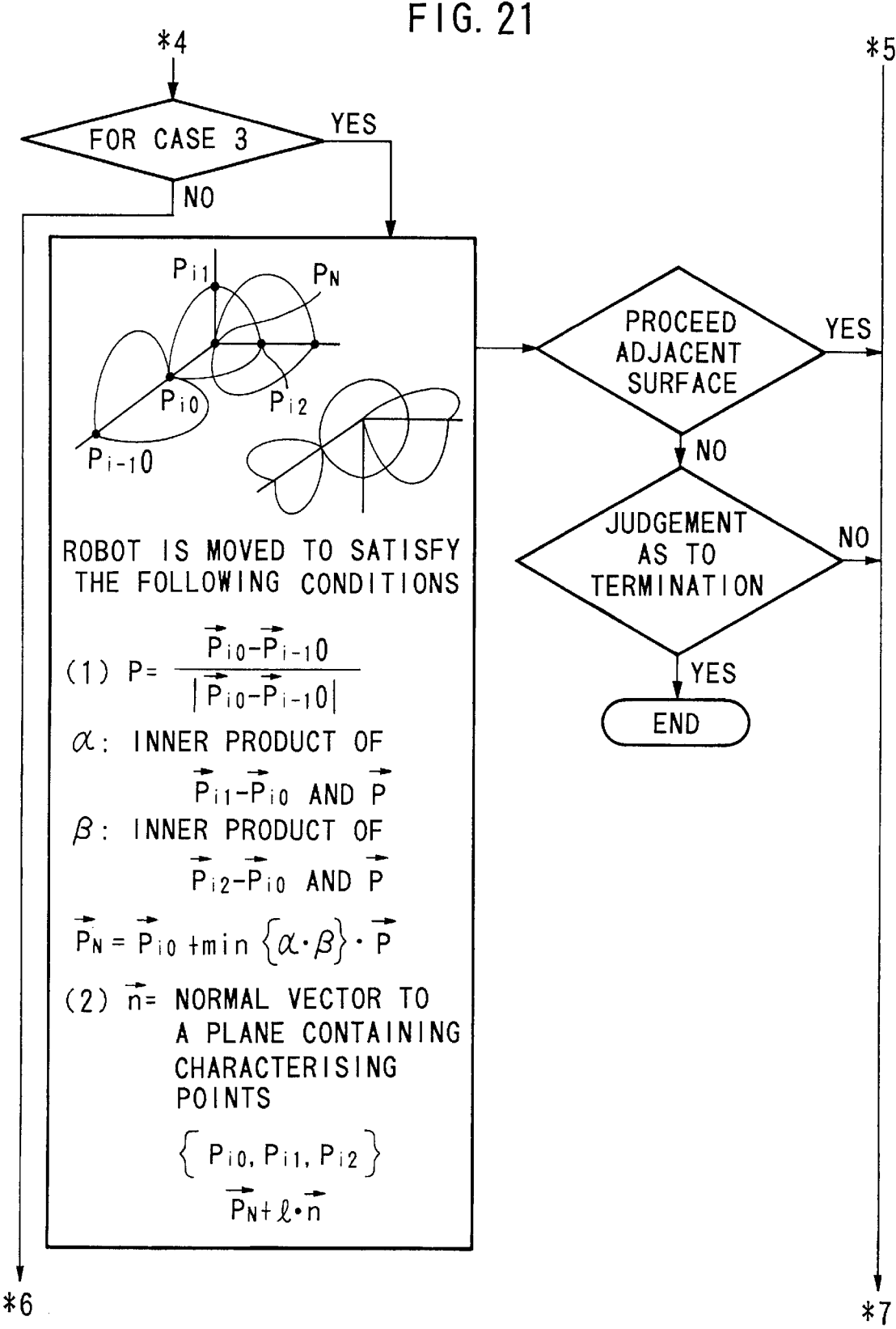
Figure 23A:
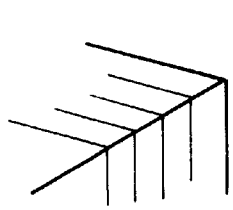
FIG. 23A, FIG. 23B, FIG. 23C, FIG. 23D, FIG. 23E and FIG. 23F are schematic perspective views which compare the robot's edge line tracking based on conventional methods, and those based on the present invention.
Figure 23B:
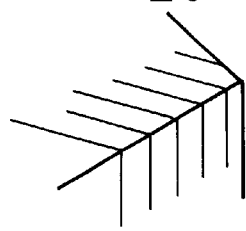
Figure 23C:
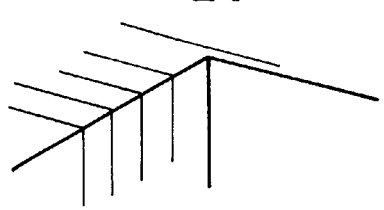
Figure 23D:
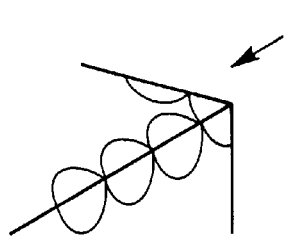
Figure 23E:
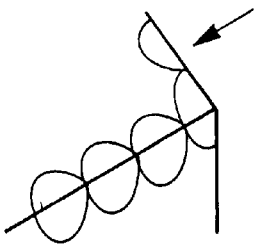
Figure 23F:
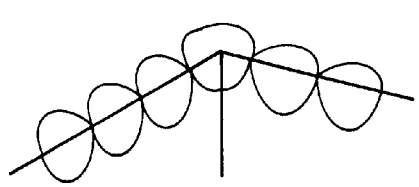

Pattern recognition device 64 for use in a method to control an industrial robot operates such that it can track an edge line formed by a number of surfaces, as FIGS. 19 and 20 illustrate, and determines the trajectory on which a robot is to be moved according to the following three cases.

(Case 1) When the features of adjacent surfaces are to be continually sampled, the position and orientation of the robot's end effector are adjusted such that the z-axis of the laser coincides with the normal direction of a plane passing through the center of the feature points and including the feature points so as to enable measurement of the entire two-dimensional pattern of the adjacent surfaces.
(Case 2) The position and orientation of the robot are adjusted so that of the two feature points, the point further from the direction of movement becomes closer.
(Case 3) The position and orientation of the robot are adjusted so that the vertex formed by the three surfaces becomes the feature point of the successive adjacent surfaces.

Because the present invention is configured in the above manner, it demonstrates the following effects.

A Device for Extracting Shape Features Using Patterned Light (1) The two-dimensional laser pattern generating device is operated for a period of $Dt_0$, the PSD image recording element measures a two-dimensional position ($x_0$, $y_0$), and a three-dimensional position (x, y, z) is calculated at $Dt_1$, the surface parameters are calculated at $Dt_2$, and the surface pattern is calculated at $Dt_3$. This procedure permits the measurements for one point to be processed in the time period from $Dt_0$ to $Dt_3$, and in the time period T, $T/(Dt_0+Dt_1+Dt_2+Dt_3)$ number of points can be measured. Further, by taking a unit time period $Dt = \max \{Dt_0 + Dt_1 + Dt_2 + Dt_3\}$ and synchronizing the calculations, ([T/Dt]−3) points can be measured in time period T (refer to FIG. 15).

(2) The memory area required for storage of input data needed for the measurements of the three-dimensional position is the area formed by ($x_p$, $y_p$) and ($x_c$, $y_c$), and less area is needed when compared with the conventional memory area for a single picture.

(3) By a conventional technique of generating a trajectory based on single slit light beam, the closer the beam is to a welding torch the more accurate the determination of the position, but the welding speed becomes limited. It is preferable, if possible, for the trajectory to be read in advance to move the robot at high speed, but if there are curves in the path then deviations in the generated trajectory will increase. The technique is incapable of dealing with case when the laser line disappears at the vertex (refer to FIGS. 23A to 23F). In contrast to this, by projecting and measuring the two-dimensional pattern (for instance, a ring pattern) in the vicinity of the center of the edge line, two feature points are measured at one time using the technique of the present invention. Conversely, in the vicinity of a vertex at which a number of edges intersect, some of the three-dimensional positions of the two-dimensional pattern cannot be measured, and the number of feature points varies, but it is possible to generate a trajectory for the robot aligned with the edge lines which are formed by a number of surfaces.

Figure 24A:
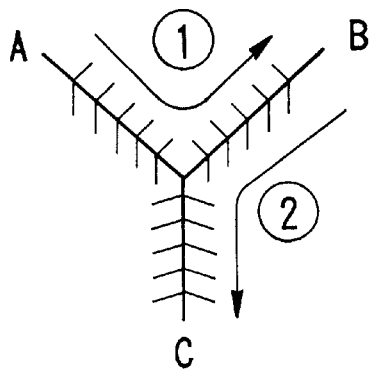
FIG. 24A, FIG. 24B and FIG. 24C are schematic perspective views which compare the measurement of the top coordinate based on the conventional system and on the present invention.
Figure 24B:
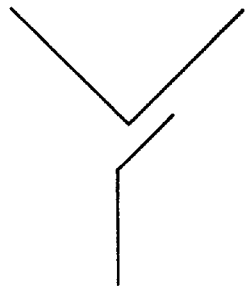
Figure 24C:
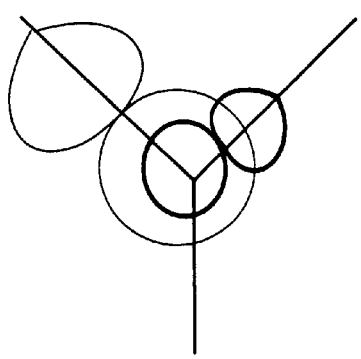
Figure 25:
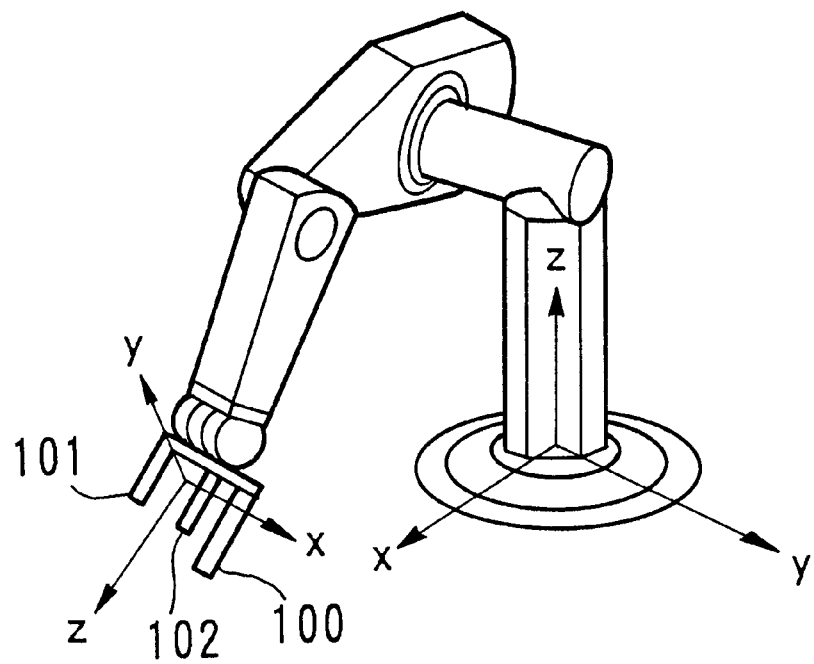
FIG. 25 is a schematic perspective view which shows the system to be welded by a range sensor attacched to the conventional robot.
Figure 26:
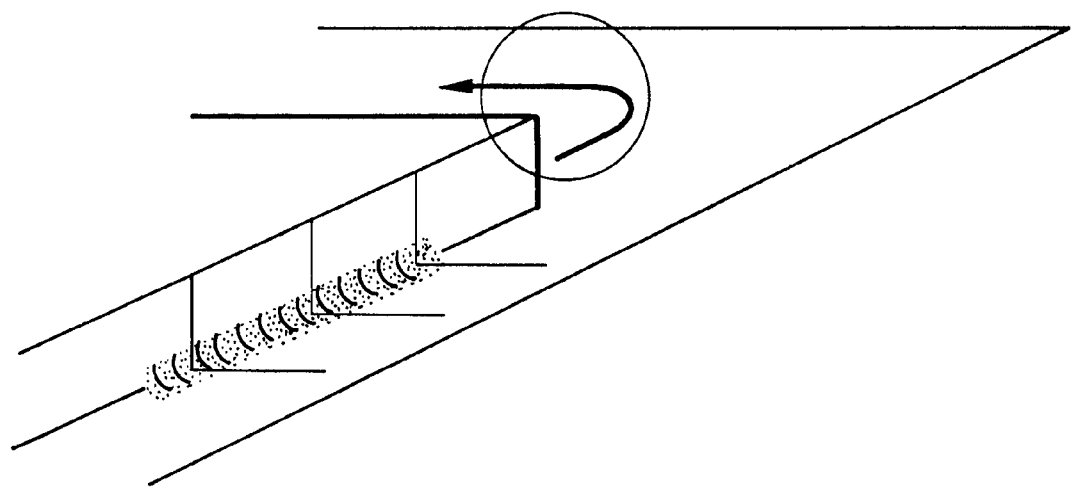
FIG. 26 is a schematic perspective view which shows problems at the time of the welding with the apparatus showing in FIG. 25.

(4) In a conventional single-slit light beam technique of generating trajectories, it is necessary to calculate the trajectory including two of the three edge lines, when measuring the position of a vertex formed by three edges. A mismatch situation arises (refer to FIGS. 24A to 24C) between the two trajectories 1 and 2 determined according to the position control error for the robot, because the position is determined by the feature extracting device which is attached to the hand of the robot. This is remedied in the present invention in which a ring pattern is projected and measured. When three or more feature points are measured in one measurement, the next ring pattern to be projected is projected so that the next ring pattern approaches the vertex, then the vertex can be measured with the robot in the identical robot position and orientation (the same robot position control error).

(5) In determining the orientation and position of a known polyhedron by projecting the laser light beam at the object and determining the slope of the projection surface, the present technique enables projecting of a specific suitable pattern on the object, or altering the pattern in accordance with the features to be measured. This approach will facilitate the identification of an object.

(6) In the conventional techniques, since a slit light beam and spot light beam cannot be used to detect the starting welding point for a welding object disposed at an approximate unknown distance, it has been necessary to provide a separate contact sensor for the welding object. By using the device of the present invention, the starting point can be detected without providing a separate sensor or moving the robot to find the starting point.

(7) To accurately control the robot hand position, the parameters of the robot mechanism must be determined by the process known as calibration by determining the error data between the work object and the actual three-dimensional position and the orientation of the robot. There is a position-measuring method which uses a mechanical three-dimensional ruler to measure the actual three-dimensional position of the robot, but it has not been possible to determine the orientation of the robot. By attaching the present invention to the robot hand and measuring a work object with a mechanical three-dimensional ruler, it is possible to readily measure the actual three-dimensional position and orientation of the robot.

A Two-Dimensional Laser Pattern Generating Device (1) By disposing a conjugate optical system comprising two relay lenses between two rotation mirrors, and optically forming an image of one rotation mirror at the position of the other rotation mirror, it is possible to device a technique so that a shape similar to the pattern drawn by the laser beam does not vary with the distance on the light axis, thus enabling measurements to be performed with few errors.

(2) By disposing a beam splitter and light position sensing device on the light path of the laser beam, and measuring the deflected position of the laser beam, it is possible to have a configuration which enables feedback control in accordance with the error between the target laser pattern and the actual pattern. Even if there are vibrations of the supporting components and rotation mirrors due to acceleration of a moving apparatus, and it becomes possible to generate an accurate projection laser pattern.

(3) By adopting a configuration which enables movement of the collimating lens of the semiconductor laser in directions perpendicular to the light axis, it is possible to achieve a compact apparatus which can deflect the laser beam in two directions, and it becomes possible to eliminate lowering of the rigidity of arms and other systems of the compact robot for which the apparatus is designed.

What is claimed is:

1. A two-dimensional laser pattern generating device comprising a semiconductor laser and a collimating lens which transforms the optical laser beam generated by this semiconductor laser into a plane wave beam, wherein said device controls the movement of said collimating lens in the directions perpendicular to the light axis.

2. A two-dimensional laser pattern generator device comprising a semiconductor laser, a collimating lens, a rotation mirror and a lens, wherein said collimating lens is disposed in a conjugate optical system which forms an image of the laser beam from said semiconductor laser on said rotation mirror, and, said rotation mirror is disposed at the rear focal point of said lens.

3. An apparatus according to claim 2 wherein the two-dimensional laser pattern generating device includes a multiple beam semiconductor laser.

4. A laser pattern generating device provided with a semiconductor laser, a collimating lens which transforms the optical laser beam generated by said semiconductor laser into a plane wave beam, two rotatably supported rotation mirrors, two relay lenses disposed between said rotation mirrors, a beam splitter disposed on the optical path of the laser beam deflected by said rotation mirrors, and an optical position sensing device which detects the deflection position of the beams split by said beam splitter, wherein said two rotation mirrors are disposed in a conjugate imaging relationship by arranging said relay lenses, and the deflection position of the laser beam is controlled by said optical position sensing device.

5. An apparatus according to claim 4 wherein the two-dimensional laser pattern generating device includes a multiple beam semiconductor laser.

* * * * *